US010708592B2

(12) United States Patent
Dong et al.

(10) Patent No.: US 10,708,592 B2
(45) Date of Patent: Jul. 7, 2020

(54) DEBLOCKING FILTER FOR VIDEO CODING AND PROCESSING

(71) Applicant: QUALCOMM Incorporated, San Diego, CA (US)

(72) Inventors: Jie Dong, Sunnyvale, CA (US); Yung-Hsuan Chao, San Diego, CA (US); Wei-Jung Chien, San Diego, CA (US); Marta Karczewicz, San Diego, CA (US); Li Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/372,180

(22) Filed: Apr. 1, 2019

(65) Prior Publication Data

US 2019/0306503 A1 Oct. 3, 2019

Related U.S. Application Data

(60) Provisional application No. 62/651,703, filed on Apr. 2, 2018.

(51) Int. Cl.
*H04N 19/117* (2014.01)
*H04N 19/176* (2014.01)
*G06K 9/62* (2006.01)
*H04N 19/159* (2014.01)

(52) U.S. Cl.
CPC ......... *H04N 19/117* (2014.11); *G06K 9/6267* (2013.01); *H04N 19/159* (2014.11); *H04N 19/176* (2014.11)

(58) Field of Classification Search
CPC ........................... H04N 19/176; H04N 19/117
See application file for complete search history.

(56) References Cited

U.S. PATENT DOCUMENTS

| | | | |
|---|---|---|---|
| 6,504,873 B1 * | 1/2003 | Vehvilainen | H04N 19/527 375/240.29 |
| 2010/0142844 A1 * | 6/2010 | Pereira | G06T 5/002 382/261 |

* cited by examiner

*Primary Examiner* — Francis Geroleo
*Assistant Examiner* — Christopher Kingsbury Glover
(74) *Attorney, Agent, or Firm* — Polsinelli LLP

(57) ABSTRACT

Deblocking is a step in video coding for removing distortions that may result from dividing a video frame into blocks, and encoding the video frame based on the blocks. Techniques described herein can include determining the activity in neighboring blocks along the boundary of the blocks, where the activity measures smoothness or complexity of pixels in the boundary area. An average of the activity can then be determined, as well a difference in the activity between the left block and the right block. The average activity and the difference in activity can then be used to determine a classification for the boundary area. The classification can further be used to select a filter to apply to the pixels in the boundary area. Once the filter have been applied, the blocks can be added to a reconstructed video frame.

30 Claims, 18 Drawing Sheets

1100

Obtaining video data including a plurality of encoded video frames
1102

↓

Determining, for a first block from an encoded video frame from the plurality of encoded video frames, a first activity among pixels in the first block
1104

↓

Determining, for a second block from the encoded video frame, a second activity among pixels in the second block, wherein the second block is immediately right of the first block within the video frame
1106

↓

Determining, using the first activity and the second activity, an average activity of the first block and the second block
1108

↓

Determining, using the first activity and the second activity, a difference in activities between the first block and the second block
1110

↓

Selecting, using the average activity and the difference in activities, a classification for a boundary between the first block and the second block
1112

↓

Selecting, using the classification, a filter
1114

↓

Applying the filter to the pixels in the first block or the pixels in the second block to smooth transitions between the pixels
1116

↓

Subsequent to applying the filter, outputting the first block and the second block to be added to a reconstructed video frame
1118

*FIG. 11*

| Identity filter | 0 | 0 | 0 | 0 | 1 | 0 | 0 | 0 | 0 | 0 |
|---|---|---|---|---|---|---|---|---|---|---|
| 1 | -0.0074 | 0.0479 | -0.2066 | 0.3383 | 0.6859 | 0.2413 | -0.1251 | 0.0373 | -0.0151 | 0.0071 | -0.0037 |
| 2 | -0.0101 | 0.039 | -0.1025 | 0.1602 | 0.8177 | 0.1712 | -0.096 | 0.0331 | -0.0142 | 0.0003 | 0.0012 |
| 3 | -0.0198 | 0.0338 | -0.3772 | 1.1079 | -0.0676 | 0.1196 | 0.3275 | -0.1184 | -0.0067 | 0.0114 | -0.0105 |
| 4 | 0.0075 | -0.0006 | -0.2165 | 0.5415 | 0.4324 | 0.2137 | 0.1719 | -0.1819 | 0.023 | 0.0277 | -0.0186 |
| 5 | -0.007 | 0.0527 | -0.2918 | 0.5331 | 0.5213 | 0.2678 | -0.0523 | -0.0289 | 0.0057 | 0.0057 | -0.0064 |
| 6 | -0.018 | -0.0569 | -0.1047 | 0.7316 | 0.1421 | 0.1803 | 0.2607 | -0.1237 | -0.0258 | 0.0295 | -0.015 |
| 7 | -0.005 | 0.0101 | -0.012 | -0.012 | 1.0401 | -0.0112 | -0.0247 | 0.0332 | -0.0294 | 0.0137 | -0.003 |
| 8 | 0.0158 | -0.0225 | -0.1226 | 0.3814 | 0.5193 | 0.2905 | 0.0067 | -0.1051 | 0.0392 | 0.0113 | -0.0137 |
| 9 | -0.0984 | -0.0585 | 0.1871 | 0.6197 | -0.0153 | 0.1547 | 0.2268 | 0.1208 | -0.1875 | 0.0952 | -0.0446 |
| 10 | -0.0217 | 0.0637 | -0.3998 | 0.8479 | 0.2852 | 0.255 | -0.0033 | -0.0257 | 0.0005 | 0.0023 | -0.004 |
| 11 | -0.0441 | -0.113 | 0.3083 | 0.2888 | 0.2391 | -0.0213 | 0.4196 | 0.0793 | -0.1513 | 0.0387 | -0.0442 |
| 12 | 0.0008 | -0.0217 | -0.1106 | 0.5119 | 0.3517 | 0.0182 | 0.482 | -0.1957 | -0.0509 | 0.0334 | -0.0192 |
| 13 | -0.1595 | 0.148 | 0.0402 | 0.4026 | 0.3833 | 0.0353 | 0.0579 | 0.0998 | 0.1186 | -0.1049 | -0.0212 |
| 14 | -0.0241 | -0.0288 | 0.0168 | 0.4345 | 0.3215 | 0.197 | 0.0424 | 0.0923 | 0.0091 | -0.0349 | -0.0258 |
| 15 | 0.0077 | -0.0063 | -0.0995 | 0.2873 | 0.6367 | 0.1621 | 0.1093 | -0.0853 | -0.0414 | 0.0489 | -0.0192 |
| 16 | -0.0106 | 0.0287 | -0.0504 | 0.0584 | 0.931 | 0.0966 | -0.0799 | 0.0388 | -0.0137 | -0.0013 | 0.0023 |

*FIG. 14*

| Identity filter | 0 | 0 | 0 | 0 | 1 | 0 | 0 | 0 | 0 | 0 |
|---|---|---|---|---|---|---|---|---|---|---|
| 1 | -0.0099 | 0.0367 | -0.0927 | 0.1379 | 0.8447 | 0.1541 | -0.0925 | 0.0356 | -0.0166 | 0.0023 | 0.0005 |
| 2 | -0.0692 | -0.0816 | 0.2055 | 0.5129 | 0.0862 | 0.0967 | 0.3013 | 0.0793 | -0.1588 | 0.0681 | -0.0404 |
| 3 | -0.0133 | 0.0524 | -0.3296 | 0.6658 | 0.4131 | 0.2579 | -0.0029 | -0.0509 | 0.0065 | 0.0083 | -0.0072 |
| 4 | -0.0072 | 0.0159 | -0.0212 | 0.006 | 1.0076 | 0.0218 | -0.041 | 0.0339 | -0.0219 | 0.0064 | -0.0004 |
| 5 | -0.0004 | -0.0372 | -0.1183 | 0.5708 | 0.3127 | 0.1055 | 0.3607 | -0.1788 | -0.0301 | 0.0338 | -0.0186 |
| 6 | -0.0782 | 0.0419 | 0.0261 | 0.4217 | 0.3462 | 0.1323 | 0.0486 | 0.0953 | 0.0529 | -0.0629 | -0.024 |
| 7 | -0.0221 | 0.0319 | -0.3524 | 0.9946 | 0.058 | 0.1675 | 0.2225 | -0.0987 | -0.0009 | 0.0076 | -0.008 |
| 8 | 0.0043 | 0.0142 | -0.1736 | 0.3762 | 0.5944 | 0.2455 | -0.0195 | -0.05 | 0.0009 | 0.0192 | -0.0114 |

*FIG. 15*

| Identity filter | 0 | 0 | 0 | 0 | 1 | 0 | 0 | 0 | 0 | 0 |
|---|---|---|---|---|---|---|---|---|---|---|
| 1 | -0.0086 | 0.0252 | -0.0506 | 0.0597 | 0.9397 | 0.0782 | -0.0634 | 0.0351 | -0.0197 | 0.0043 | 0.0001 |
| 2 | -0.0413 | -0.028 | 0.0113 | 0.5167 | 0.2532 | 0.11 | 0.2693 | -0.043 | -0.0349 | 0.0132 | -0.0265 |
| 3 | -0.0222 | 0.047 | -0.3615 | 0.8913 | 0.1867 | 0.2079 | 0.1226 | -0.0718 | 0.0012 | 0.0056 | -0.0068 |
| 4 | -0.003 | 0.0236 | -0.183 | 0.407 | 0.5715 | 0.2326 | -0.018 | -0.0343 | 0.0023 | 0.0121 | -0.0106 |

FIG. 16

| Identity filter | 0 | 0 | 0 | 0 | 1 | 0 | 0 | 0 | 0 | 0 |
|---|---|---|---|---|---|---|---|---|---|---|
| 1 | -0.0086 | 0.0252 | -0.0506 | 0.0597 | 1 | 0.0782 | -0.0634 | 0.0351 | -0.0197 | 0.0043 | 0.0001 |
| 2 | -0.0413 | -0.028 | 0.0113 | 0.5167 | 0.9397 | 0.11 | 0.2693 | -0.043 | -0.0349 | 0.0132 | -0.0265 |
| 3 | -0.0222 | 0.047 | -0.3615 | 0.8913 | 0.2532 | 0.2079 | 0.1226 | -0.0718 | 0.0012 | 0.0056 | -0.0068 |
| 4 | -0.003 | 0.0236 | -0.183 | 0.407 | 0.1867 | 0.2326 | -0.018 | -0.0343 | 0.0023 | 0.0121 | -0.0106 |
| 5 | 0.018 | -0.0893 | -0.011 | 0.4591 | 0.5715 | 0.6138 | -0.3006 | 0.2054 | -0.1696 | 0.1061 | -0.0415 |
| 6 | -0.0236 | 0.0284 | -0.0063 | -0.0321 | 0.21 | -0.0568 | 0.035 | -0.0105 | -0.0045 | 0.0091 | -0.0064 |
| 7 | -0.0249 | 0.0602 | -0.1356 | 0.2573 | 1.0678 | 0.4405 | -0.3198 | 0.2348 | -0.1562 | 0.0692 | -0.0198 |
| 8 | -0.0351 | 0.0907 | -0.2774 | 0.6209 | 0.5952 | 0.4326 | -0.131 | 0.0158 | -0.0077 | 0.0141 | -0.0137 |
| 9 | -0.1258 | 0.1881 | -0.1073 | 0.3671 | 0.2912 | -0.2316 | 0.207 | 0.1303 | 0.0399 | -0.098 | -0.0083 |
| 10 | -0.0201 | -0.0809 | -0.0309 | 0.6796 | 0.6393 | 0.3071 | 0.1986 | -0.0566 | -0.1023 | 0.0891 | -0.0498 |
| 11 | -0.0904 | -0.0783 | 0.2508 | 0.6148 | 0.0668 | 0.0951 | 0.4039 | 0.095 | -0.2242 | 0.1712 | -0.1082 |
| 12 | -0.0625 | 0.0355 | 0.1234 | -0.0754 | -0.129 | 0.4969 | -0.4061 | 0.2546 | -0.0472 | -0.0541 | 0.0227 |
| 13 | -0.0062 | 0.0079 | -0.013 | 0.0055 | 0.7125 | 0.1143 | -0.1387 | 0.1408 | -0.1064 | 0.0536 | -0.0185 |
| 14 | 0.0326 | -0.1103 | 0.175 | -0.2046 | 0.9613 | -0.2154 | 0.1437 | -0.0557 | -0.002 | 0.0276 | -0.0222 |
| 15 | -0.0781 | 0.2418 | -0.1939 | -0.048 | 1.2318 | -0.5242 | 0.3619 | -0.1108 | 0.0255 | -0.0646 | 0.053 |
|  |  |  |  |  | 1.3369 |  |  |  |  |  |  |

*FIG. 17*

| Identity filter | 0 | 0 | 0 | 0 | 0 | 512 | 0 | 0 | 0 | 0 | 0 |
|---|---|---|---|---|---|---|---|---|---|---|---|
| 1 | -4 | 13 | -26 | 31 | 40 | 481 | -33 | 18 | -10 | 2 | 0 |
| 2 | -21 | -14 | 6 | 264 | 56 | 130 | 138 | -22 | -18 | 7 | -14 |
| 3 | -11 | 24 | -185 | 456 | 106 | 95 | 63 | -37 | 1 | 3 | -3 |
| 4 | -2 | 12 | -94 | 208 | 119 | 293 | -9 | -17 | 1 | 6 | -5 |
| 5 | 9 | -46 | -6 | 235 | 314 | 108 | -154 | 105 | -87 | 55 | -21 |
| 6 | -12 | 14 | -3 | -17 | -29 | 547 | 18 | -5 | -2 | 4 | -3 |
| 7 | -13 | 31 | -69 | 132 | 225 | 305 | -164 | 120 | -80 | 35 | -10 |
| 8 | -18 | 46 | -142 | 318 | 222 | 149 | -67 | 8 | -4 | 7 | -7 |
| 9 | -64 | 96 | -55 | 188 | -119 | 327 | 106 | 67 | 20 | -50 | -4 |
| 10 | -10 | -41 | -16 | 348 | 157 | 34 | 102 | -29 | -52 | 45 | -26 |
| 11 | -46 | -40 | 128 | 315 | 48 | -66 | 207 | 49 | -115 | 87 | -55 |
| 12 | -32 | 18 | 63 | -39 | 255 | 365 | -208 | 130 | -24 | -28 | 12 |
| 13 | -3 | 4 | -7 | 3 | 58 | 492 | -71 | 72 | -54 | 27 | -9 |
| 14 | 17 | -57 | 90 | -105 | -110 | 631 | 73 | -29 | -1 | 14 | -11 |
| 15 | -40 | 124 | -99 | -25 | -268 | 685 | 185 | -57 | 13 | -33 | 27 |

FIG. 18

DEBLOCKING FILTER FOR VIDEO CODING AND PROCESSING

CROSS-REFERENCES TO RELATED APPLICATIONS

This application claims priority to U.S. Provisional Application No. 62/651,703, filed on Apr. 2, 2018, which is incorporated herein in its entirety.

FIELD

This application is related to a filtering process performed on video frames distorted by compression, blurring, etc., to improve objective and/or subjective qualities. Techniques and systems described herein can be applied to any of the existing video codecs (e.g., Advanced Video Coding (AVC), High Efficiency Video Coding (HEVC), or any other suitable video codec) or can be proposed as a coding tool to future video coding standards. Techniques and systems described herein can also be used as a post-processing method on video frames outputted from either standard or proprietary codecs.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC), as well as Joint Collaboration Team on 3D Video Coding Extension Development (JCT-3V) of ITU-T Video Coding Experts Group (VCEG) and ISO/IEC Motion Picture Experts Group (MPEG).

In 2016, MPEG and ITU-T VCEG formed a joint exploration video team (WET) to explore new coding tools for the next generation of video coding standard. The reference software is called JEM (joint exploration model).

BRIEF SUMMARY

In various implementations, provided are systems, methods, and computer-readable medium for deblocking in a video coding processes. Techniques described herein can include determining the activity in neighboring blocks along the boundary of the blocks, where the activity measures smoothness or complexity of pixels in the boundary area. An average of the activity can then be determined, as well a difference in the activity between the left block and the right block. The average activity and the difference in activity can then be used to determine a classification for the boundary area. The classification can further be used to select a filter to apply to the pixels in the boundary area. Once the filter have been applied, the blocks can be added to a reconstructed video frame.

BRIEF DESCRIPTION OF THE DRAWINGS

Illustrative examples are described in detail below with reference to the following figures:

FIG. 11 includes a flowchart illustrating an example process for coding video data;

FIG. 14 shows an example of FilterSetBS2 with size 16;

FIG. 15 shows an example of FilterSetBS2 with size 8;

FIG. 16 shows an example of FilterSetBS2 with size 4;

FIG. 17 shows an example of FilterSetBS1 with size 16; and

FIG. 18 shows an example of an integer representation of FilterSetBS1.

DETAILED DESCRIPTION

Figure 1:
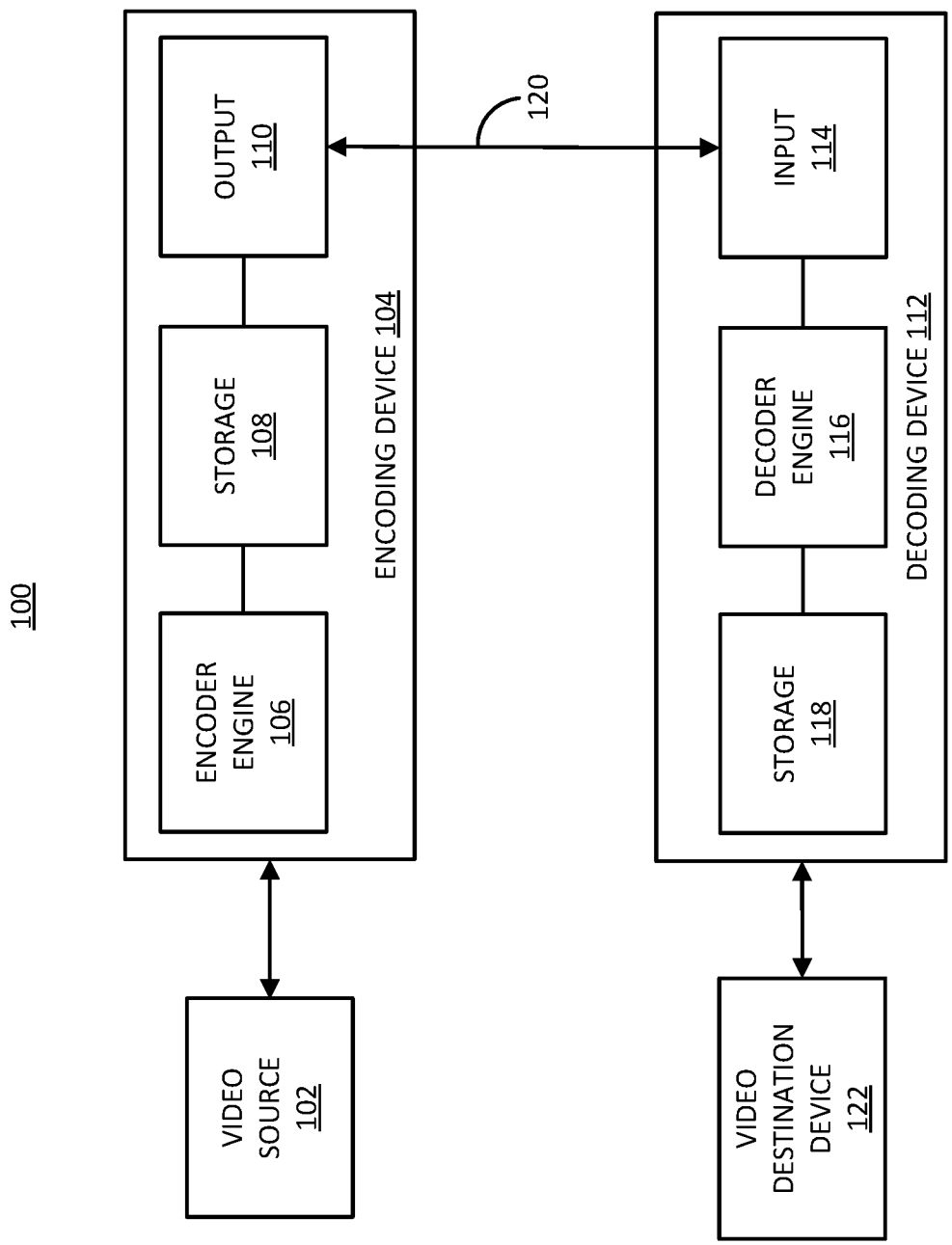
FIG. 1 is a block diagram illustrating an example of a system including an encoding device and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that an individual embodiment may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Deblocking is a step in video coding for removing distortions that may result from dividing a video frame into blocks, and encoding the video frame based on the blocks. A deblocking filter can smooth the edges of the blocks, thereby improving the appearance of a reconstructed video frame. Herein, coding refers to either encoding or decoding, or both.

Some video codecs, such as High Efficiency Video Coding (HEVC or H.265) use deblocking schemes intended to find a balance between computational complexity and coding efficiency. Reducing computational complexity enables a video to be encoded or decoded on available computing hardware within a specified amount of time. Increasing coding efficiency reduces the size of the compressed video data. The desire to reduce computational complexity, however, can result in deblocking schemes that are over-simplified and that result in poorer coding efficiency. For example, some deblocking schemes consider the average of the local activities between two blocks, but otherwise treat the two blocks the same, without considering differences in the activities in the two blocks. As another example, some deblocking schemes only perform coarse filtering, even when smoother filtering would be more appropriate.

Improvements in computer hardware can enable deblocking techniques that take into consideration a larger number of factors when selecting and applying filters for deblocking. These techniques can take advantage of computational resources to perform more complex processing, which can result in better coding efficiency and/or which can improve the appearance of reconstructed video frames. For example, these techniques can include determining the activity in neighboring blocks along the boundary of the blocks, where the activity measures smoothness or complexity of pixels in the boundary area. An average of the activity can then be determined, as well a difference in the activity between the left block and the right block. The average activity and the difference in activity can then be used to determine a classification for the boundary area. The classification can further be used to select a filter to apply to the pixels in the boundary area. Once the filter have been applied, the blocks can be added to a reconstructed video frame.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the multiview extension to HEVC, called MV-HEVC, and the scalable extension to HEVC, called SHVC, or any other suitable coding protocol. Further, coding tools exist for screen-content material such as text and graphics with motion, as well as technologies that improve the coding efficiency for screen content. A H.265/HEVC screen content coding (SCC) extension is being developed to cover these new coding tools. In 2016, MPEG and ITU-T VCEG formed a joint exploration video team (JVET) to explore new coding tools for the next generation of video coding standard. The reference software is called JEM (joint exploration model).

Many embodiments described herein describe examples using the HEVC standard, or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL (Random Access Skipped Leading picture) flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. An HEVC bitstream, for example, may include one or more CVSs including data units called network abstraction layer (NAL) units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and is square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, direct current (DC) prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, inter-prediction using uni-prediction may be performed, in which case each prediction block can use one motion compensated prediction signal, and P prediction units are generated. In some examples, inter-prediction using bi-prediction may be performed, in which case each prediction block uses two motion compensated prediction signals, and B prediction units are generated.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoder 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a one-dimensional vector, the encoder engine 106 may entropy encode the one-dimensional vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units. A sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). The goal of the parameter sets is bit rate efficiency, error resiliency, and providing system layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

The output 110 of the encoding device 104 may send the NAL units making up the encoded video data over the communications link 120 to the decoding device 112 of the receiving device. The input 114 of the decoding device 112 may receive the NAL units. The communications link 120 may include a signal transmitted using a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the output 110. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 receives the encoded video data and may provide the video data to the decoder engine 116 or to storage 118 for later use by the decoder engine 116. The decoder engine 116 may decode the encoded video data by entropy decoding (e.g., using an entropy decoder) and extracting the elements of the coded video sequence making up the encoded video data. The decoder engine 116 may then rescale and perform an inverse transform on the encoded video data. Residues are then passed to a prediction stage of the decoder engine 116. The decoder engine 116 then predicts a block of pixels (e.g., a PU). In some examples, the prediction is added to the output of the inverse transform.

The decoding device 112 may output the decoded video to a video destination device 112, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 12. An example of specific details of the decoding device 112 is described below with reference to FIG. 13.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

Blocking artifacts are the horizontal and vertical discontinuities that were not present in a picture when the picture was originally captured by a still or video camera. Blocking artifacts can be caused by moderate to high compression, and can cause a reconstructed version of the picture to have the appearance of being made up of tiles. In areas of the picture that have high contrast, the tiling effect may be masked, but in flat or uniform areas of the picture, the tiling may be particularly noticeable. In a video, block artifacts may be observed as moving or flickering due to discontinuities being in different locations in successive frames.

One source of blocking artifacts is the block-based transform coding (which can include transform and quantization) on intra-prediction and inter-prediction errors. Coarse quantization of the transform coefficients can cause visually disturbing discontinuities at the block boundaries. For videos, motion compensated prediction is another potential source of blocking artifacts. Motion compensated blocks are generated by copying interpolated pixel data from different locations of possibly different reference frames. The pixel data that is being copied from is likely to not be a perfect match for the pixels that are being generated, hence, discontinuities on the boundary of the copied blocks of data may arise.

Deblocking can be performed after a picture is reconstructed, in order to attenuate the blocking artifacts. For example, deblocking modifies the values of the samples located near each block boundary, by filtering, clipping, a combination thereof, and/or any other means, such that the discontinuity is smoothed and not so visible.

In video compression, deblocking can be performed be placed outside the prediction loop, in which case deblocking can operate on the display buffer. Alternatively or additionally, deblock can be performed in the prediction loop, such that the deblocked frames are used as reference frames for the motion compensation of future frames. Both methods provide better subjective quality of the displayed video, while the latter offers benefits in objective performance as well, because the accuracy of inter prediction is improved by using deblocked reference frames.

The deblocking in HEVC, for example, is an in-loop processing. In some examples, deblocking is applied to boundaries between blocks when a boundary: (1) is a boundary of a coding unit (CU), a prediction unit (PU), or a transform unit (TU), and (2) has an x-coordinate and a y-coordinate that are multiples of eight. The second condition means the minimum distance of two parallel neighboring boundaries to be deblocked is eight pixels, which facilitates better parallel processing. A boundary to be processed can be divided into multiple non-overlapping four-sample segments, which is then a unit of data to which deblocking is applied.

In the following discussion, deblocking operations on segments will be discussed, with the segment being assumed to be vertical. The deblocking techniques discussed below can also be performed on horizontal segments, and these techniques follow essential the same process that is discussed below for vertical segments.

Figure 2:
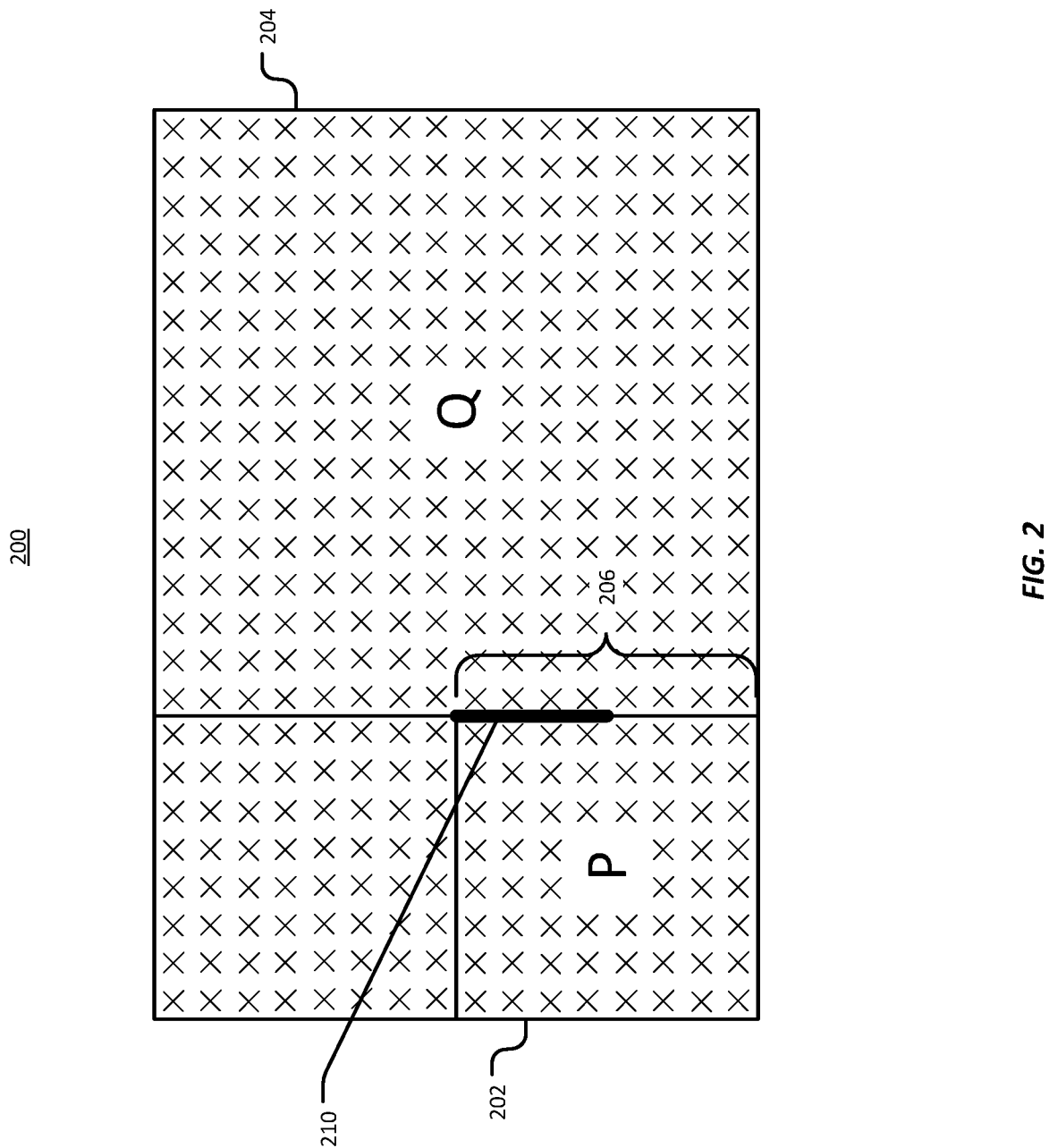
FIG. 2 includes a diagram of a group of blocks that can be part of an encoded video frame.

FIG. 2 includes a diagram of a group of blocks 200 that can be part of an encoded video frame. The group of blocks 200 includes a first block, which will be referred to as the left block or the P 202 block and a second block, which will be referred to as the right block or the Q 204 block. The P 202 block and the Q 204 block represent blocks in an encoded video frame that are adjacent to one another, and thus share a boundary 206. In some examples, the P 202 block and the Q 204 block are the same size, and in some examples, such as is illustrated in FIG. 2, the P 202 block and the Q 204 block are different in size. Note that "P" and "Q" are conventional terms for adjacent blocks, and that other labels (such as left and right) can be used to refer to the blocks.

A segment 210 is a section of the boundary 206 that can be shorter than the full length of the boundary 206. For example, the segment 210 can be four pixels (which can also be referred to as samples) in length. When the segment 210 is processed, coding conditions, such as the motion vectors, reference indices and/or presence of non-zero transform coefficients, among other examples, of the P 202 and the Q 204 blocks can be examined. A boundary strength can then be determined based on the coding conditions. The boundary strength represents a likelihood that strong blocking artifacts may appear along the segment 210. As an example, the boundary strength value can be 0, meaning that the coding conditions of the P 202 and Q 204 blocks do not cause blocking artifacts, and deblocking for the segment 210 need not be performed. As another example, the boundary strength value can be 2, which means that the coding conditions in the P 202 and Q 204 blocks may cause severe blocking artifacts, and that strong filtering should be applied. As a further example, the boundary strength value can be 1, which means that some blocking artifacts may be present along the segment 210. Boundary strength determination is further discussed in Section 7.2.2.1 of V. Sze, M. Budagavi, G. Sullivan, "High efficiency video coding (HEVC): algorithms and architectures," Springer International Publishing, August 2014.

Different boundary strength values can be used for chroma components than for the luma components of the samples. For example, for the chroma components, when the P 202 block or the Q 204 block is intra-coded, the boundary strength value is equal to 2, otherwise the boundary strength value is equal to 0.

The luma components may be treated differently from the chroma components. For example, as discussed above, the possibility that the segment 210 has blocking artifacts can be estimated based on the coding conditions of the P 202 and Q 204 blocks. But the coding conditions can only provide an approximation of the severity of the blocking artifacts. Whether deblocking should be applied to the segment 210, and the amount of deblocking filtering that should be applied, can be more precisely determined by analyzing the values of the samples near the segment 210.

Figure 3:
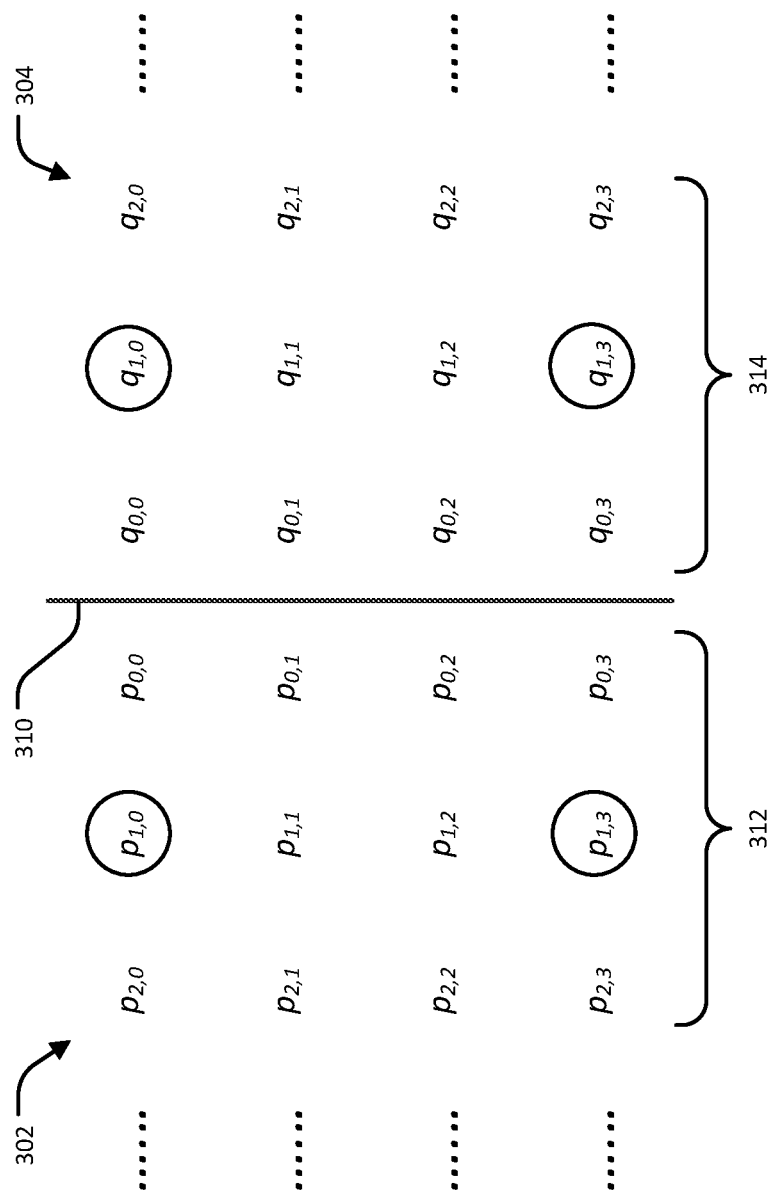
FIG. 3 includes a diagram illustrating an example of pixels or samples along a segment of a boundary between a left block and a right block.

FIG. 3 includes a diagram illustrating an example of pixels or samples along a segment 310 of a boundary between a left, or P 302, block and a right, or Q 304 block. In this example, the segment 310 is four samples in length. Also in this example, p samples 312 from the P 302 block and q samples 314 from the Q 304 that are up to three positions away from the segment 310 are being analyzed. In other examples, more or fewer samples can be considered. In the example of FIG. 3, the position of a sample is indicated relative the segment 310, with positions closer to the segment 310 having a lower value, and positions closer to the top of the segment 310 having a lower value.

Whether to perform deblocking on the segment 310 can first be determined by calculating second derivatives of four samples near the segment 310. In FIG. 3 four samples that can be used for calculating second derivatives have been circled ($p_{1,0}$, $p_{1,3}$, $q_{1,0}$, and $q_{1,3}$). In other examples, other samples near the segment 310 can be used. The summation of the second derivatives, illustrated in Equation (1) below in comparison to a threshold value $\beta$, can be used to determine whether deblocking should be applied to the segment 310.

$$|p_{2,0}-2p_{1,0}+p_{0,0}|+|p_{2,3}-2p_{1,3}+p_{0,3}|+|q_{2,0}-2q_{1,0}+q_{0,0}|+ \\ |q_{2,3}-2q_{1,3}+q_{0,3}|<\beta \qquad (1)$$

As provided in Equation (1), if the summation of the four second derivatives of the selected samples is less than the threshold $\beta$, deblocking will be performed on the segment. When the summation is greater than or equal to the threshold, then the segment 310 is likely in an area of the picture that is non-uniform in color and/or texture (e.g., the area is not flat in appearance). In such an area, blocking artifacts are likely to be masked by the non-uniformity of the local samples, and thus deblocking may not be needed. It should be noted that a decision to not perform deblocking may be made even when the previously-determined boundary segment value is non-zero.

When the segment 310 is to be deblocked, strong or normal filtering can be used. Equations (2-1) through (2-6) below can be used to determine the filtering mode. When all six equations are true, then the area around the segment 310 is likely to be very uniform (e.g., smooth in appearance) and thus blocking artifacts are likely to be highly visible. Thus, when all six equations are true, then strong filtering mode is used. Otherwise, normal filtering mode is used.

$$|p_{2,0}-2p_{1,0}+p_{0,0}|+|q_{2,0}-2q_{1,0}+q_{0,0}|<\beta/8 \qquad (2\text{-}1)$$

$$|p_{2,3}-2p_{1,3}+p_{0,3}|+|q_{2,3}-2q_{1,3}+q_{0,3}|<\beta/8 \qquad (2\text{-}2)$$

$$|p_{3,0}-p_{0,0}|+|q_{0,0}-q_{3,0}|<\beta/8 \qquad (2\text{-}3)$$

$$|p_{3,3}-p_{0,3}|+|q_{0,3}-q_{3,3}|<\beta/8 \qquad (2\text{-}4)$$

$$|p_{0,0}-q_{0,0}|<2.5t_C \qquad (2\text{-}5)$$

$$|p_{0,3}-q_{0,3}|<2.5t_C \qquad (2\text{-}6)$$

In Equations (2-1) through (2-6), $t_C$ is a clipping parameter, which is discussed further below.

In various examples, the boundary strength determination discussed above and the decisions that are made based on Equation (1) and Equations (2-1) through (2-6) are made at the segment level. Once a filtering mode (strong or normal) has been selected, for a vertical segment 310 such as is illustrated in FIG. 3, the filtering is applied line by line (for a horizontal segment, the filtering is applied column by column).

Figure 4:
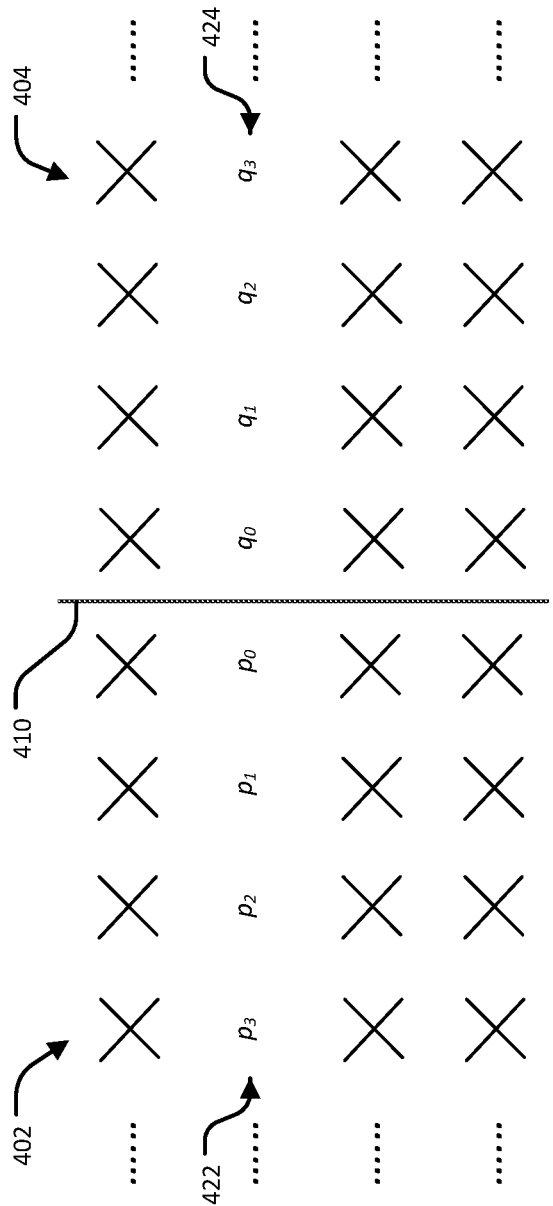
FIG. 4 includes a diagram illustrating one line of pixels or samples from among (in this example) four lines of samples along a segment.

FIG. 4 includes a diagram illustrating one line of pixels or samples from among (in this example) four lines of samples along a segment 410 of a boundary between a left, or P 402, block, and a right, or Q 404, block. The line of samples includes a set of p samples 422 from the P 402 block and a set of q samples 424 from the Q 404 block. In other examples, more or fewer samples in one line can be considered. In the example of FIG. 4, the position of the sample with respect to the segment 410 is indicated with subscripts.

In the following discussion, operations for one line are described, with the assumption that the same operations can be performed on additional lines along the segment 410.

In some examples, when strong filtering mode is applied on the luma components, three samples on either side of the segment 410 are processed. For example, for samples $p_0$, $p_1$, and $p_2$ from the P 402 block, updated (e.g., filtered) values $p_0'$, $p_1'$, and $p_2'$ can be computed using low-pass filtering, as is illustrated in Equations (3-1) through (3-3) below.

$$p_0' = (p_2 + 2p_1 + 2p_0 + 2q_0 + q_1 + 4) \gg 3 \qquad (3\text{-}1)$$

$$p_1' = (p_2 + p_1 + p_0 + q_0 + 2) \gg 2 \qquad (3\text{-}2)$$

$$p_2' = (2p_3 + 3p_2 + p_1 + p_0 + q_0 + 4) \gg 3 \qquad (3\text{-}3)$$

In some examples, filtered sample values (i=0, 1, 2) are clipped to be within the range $[p_i - 2t_C, p_i + 2t_C]$. Clipping can limit the change to the samples when the change is greater than $t_C$.

The samples $q_0$, $q_1$, and $q_2$ from the Q 404 block can also be processed using Equations (3-1) through (3-3) by substituting $q_0$, $q_1$, and $q_2$ for $p_0$, $p_1$, and $p_2$, respectively.

In some examples, when normal filtering mode is used, one or two samples on either side of the segment 410 are processed. For samples to the left of the segment 410, the condition in Equation (4-1) below can be checked. When the condition is true, then $p_0$ and $p_1$ will be processed, otherwise just $p_0$ will be processed. For samples to the right of the segment 410, the condition of Equation (4-2) below can be used to determine if $q_0$ and $q_1$ will be processed, or only $q_0$ will be processed. Because which samples are to be processed on one side of the segment 410 is determined independently from which samples are to be processed on the other side of the segment, it may be that different numbers of samples on either side of the segment 410 are processed.

$$|p_{2,0} - 2p_{1,0} + p_{0,0}| + |p_{2,3} - 2p_{1,3} + p_{0,3}| < (3/16)\beta \qquad (4\text{-}1)$$

$$|q_{2,0} - 2q_{1,0} + q_{0,0}| + |q_{2,3} - 2q_{1,3} + q_{0,3}| < (3/16)\beta \qquad (4\text{-}2)$$

To process $p_0$ and $q_0$, an intermediate value $\delta$ is first calculated as provided in Equation (5):

$$\delta = (9(q_0 - p_0) - 3(q_1 - p_1) + 8) \gg 4 \qquad (5)$$

When the absolute value of $\delta$ is greater than or equal to ten times $t_C$, the boundary is considered a natural edge, which should be preserved. Deblocking in this case is then not performed on the current line. When $\delta$ is less than ten times $t_C$, then $\delta$ is clipped to be within the range of $-t_C$ to $t_C$, as shown in Equation (6).

$$\Delta_0 = \text{Clip3}(-t_C, t_C, \delta) \qquad (6)$$

Updated, or filtered, values of $p_0$ and $q_0$, $p_0'$ and $q_0'$, can be computed by adding and subtracting $\Delta_0$, as illustrated in Equations (7-1) and (7-2) below:

$$p_0' = p_0 + \Delta_0 \qquad (7\text{-}1)$$

$$q_0' = q_0 - \Delta_0 \qquad (7\text{-}2)$$

Equations (8-1) and (8-2) below can be used to process the $p_1$ and $q_1$ samples to produce updated or filtered versions $p_1'$ and $q_1'$.

$$p_1' = p_1 + \text{Clip3}\left(-\frac{t_c}{2}, \frac{t_c}{2}, (((p_2 + p_0 + 1) \gg 1) - p_1 + \Delta_0) \gg 1\right) \qquad (8\text{-}1)$$

$$q_1' = p_1 + \text{Clip3}\left(-\frac{t_c}{2}, \frac{t_c}{2}, (((q_2 + q_0 + 1) \gg 1) - q_1 - \Delta_0) \gg 1\right) \qquad (8\text{-}2)$$

In some examples, deblocking of the chroma components can be based on the boundary segment value, and no analysis of the samples is needed. The first sample on either side of the segment 410, $p_0$ and $q_0$, can be processed using Equations (7-1) and (7-2) above. For the chroma components, $\Delta_0$ can be computed as provided in Equation (9) below:

$$\Delta_0 = \text{Clip3}(-t_C, t_C, (((q_0 - p_0) \ll 2) + p_1 - q_1 + 4) \gg 3) \qquad (9)$$

The thresholds $\beta$ and $t_C$ will now be described. To avoid excessive filtering, the parameters $\beta$ and $t_C$ are used in the deblocking process, as described above. The threshold $\beta$ is used in controlling the way deblocking should be performed. For example, $\beta$ can be used to determine whether the segment should be deblocked, whether strong or normal deblocking should be used, whether one or two samples on one side of the segment should be processed, and so on. When $\beta$ or a scaled $\beta$ is reached or exceeded (see, e.g., Equations (1), (2), and (4)), the local sample values vary by a larger amount, and more conservative deblocking is applied to preserve details in the original picture. When $\beta$ is not exceeded, then the local sample values have less variation (e.g., the samples are smoother), and deblocking can be performed more aggressively.

The clipping value $t_C$ is mainly used in controlling the maximum change of sample magnitude (except in Equations (2-5) and (2-6)). In the normal filtering mode or filtering for chroma, the change of sample magnitude should not exceed $\pm t_C$ for the first sample on one side of segment (applicable to luma and chroma), or $\pm t_C/2$ for the second sample (applicable only to luma). In the strong filtering mode, where greater change in magnitude is implied, the maximum change is $\pm 2t_C$ for the three samples processed on either side of the segment.

The values of $\beta$ and $t_C$ depend mainly on the QP values from the left block P 402 and right block Q 404. For example, the average of the QPs from P 402 and Q 404, denoted as $QP_{ave} = (QP_P + QP_Q + 1) \gg 1$, can be used as the index to search two one-dimensional look-up tables (LUTs), one for each of $\beta$ and $t_C$. Although the index for finding the $t_C$ value can be adjusted by adding two (e.g., $QP_{ave} + 2$), when the boundary strength value equals 2, the dominant factor determining the values of $\beta$ and $t_C$ will be $QP_{ave}$. In both LUTs, the entry values monotonically increase with the value of the search indices, which means a higher $QP_{ave}$, correlates to larger values of $\beta$ and $t_C$. Thus stronger deblocking is likely to occur when $QP_{ave}$ is high, and a greater magnitude of change is allowed. Lower QP values, on the other hand, may result in smaller or possibly zero values for $\beta$ and $t_C$. Blocks coded with low QP values likely have few blocking artifacts, thus little to no deblocking may be needed for the boundary between these blocks.

In some examples, the indices used to find of β and $t_C$ in the LUTs, denoted $idx_\beta$ and $idx_{tc}$, can be adjusted by two parameters beta_offset_div2 and tc_offset_div2, respectively, as illustrated in Equations (10-1) and (10-2) below:

$$idx_\beta = QP_{ave} + 2 \times beta\_offset\_div2 \quad (10\text{-}1)$$

$$idx_{tc} = QP_{ave} + 2 \times (BS-1) + 2 \times tc\_offset\_div2 \quad (10\text{-}2)$$

The parameters beta_offset_div2 and tc_offset_div2 can be sent in a slice header or in a picture parameter set (PPS). This flexibility gives an encoder the ability to adapt the deblocking strength depending on the sequence characteristics, the encoding mode, and other factors.

In HEVC, deblocking can be performed in two stages: first, all vertical block boundaries in the picture are filtered; then, all the horizontal block boundaries are filtered. In the second stage, the samples that are used for mode decisions and filtering are the samples that have been modified by the first stage. In each stage, boundaries are at least eight samples apart. Samples involved in deblocking can include up to four samples on each side of the boundary, three to be filtered plus one that is used for filtering and mode decision making. The samples involved in deblocking adjacent boundaries are thus non-overlapping, and each boundary can be deblocked independent and in parallel with other boundaries.

In HEVC, deblocking operations can include filtering the samples near a block boundary and clipping the change in the sample magnitudes. One of three levels of the filter strengths can be used: strong, normal, or zero (e.g., no filtering), where the filter that is selected is based on the local activity of samples near a block boundary (e.g., stronger filtering is applied when there is less local activity, and lesser filtering is applied when there is more activity; see Equations (1) and (2)). For the strong filtering mode, three samples on each side of a block boundary are filtered using low pass filters (see Equation (3)). For the normal filtering mode, at least the sample closest to the boundary is filtered, and on either side the second closest sample may be filtered if the samples closer to the boundary are smooth (see Equation (4)). Clipping is controlled by the parameter $t_C$. When strong filtering is applied, the change of sample magnitude is no greater than $t2_C$, and when normal filtering is applied, the change in magnitude of the first and second samples from the boundary is no greater than $t_C$ and $t_C/2$, respectively (see Equations (6) through (8)). Different boundary strength values can change $t_C$; for example, a segment with a boundary strength value of 2 can have a larger $t_C$ than a segment with a boundary strength value of 1.

The HEVC scheme deblocking essentially follows the framework of H.264/AVC deblocking. The HEVC scheme thus inherits the main features of H.264/AVC, such as the boundary strength being based on coding conditions, multi-level filtering strengths from strong down to zero, and QP and the boundary strength being dependent parameters β and $t_C$, among other examples. Compared with H.264/AVC deblocking, the new design elements in HEVC deblocking enable easier parallel processing and a better fit into HEVC's larger block-size coding structure, but do not dedicate much to improving the coding efficiency. Therefore, HEVC deblocking, which was considered a good trade-off between computational complexity and coding efficiency at the finalization of HEVC in 2013, may be oversimplified in view of improvements in hardware since 2013. Computational resources of computing hardware can be leveraged for significant improvement in coding efficiency, while still maintaining a deblocking scheme that can be parallelized. Examples of aspects in HEVC deblocking that can be further improved are listed as below.

As a first example, using only three levels to represent the smoothness (e.g., the uniformity of the pixels) of the boundary area, corresponding to three levels of filtering strength, may be too coarse.

As a second example, only two out of the four lines of a segment are used in determining the deblocking mode and in selecting the filter, and in each line, only four samples from either side of the segment are used. Since the block size in some video codecs could be up to 128×128, using such a small portion of samples for mode decision may not reflect the real activity of the boundary area very well, and may make the decision process sensitive to noise.

As a third example, the samples to be filtered on either side of a segment can be as many as three, but can be as few as one, which may not be enough for deblocking a large block.

As a fourth example, five pre-defined 4-tap or 5-tap filters are pre-assigned to the three samples when strong filtering mode is used (see Equation (3)). In normal filtering mode, the same five pre-defined filters are pre-assigned to two samples (see Equations (5) to (8)). This limited number of filters, their short lengths, and inflexibility in which filters can be selected may cause lower coding efficiency in the deblocking process.

As a fifth example, segments with different boundary strengths could have quite different local activities, but share the same deblocking filters (though the clipping value is larger for boundary strength values equal to 2)

As a sixth example, the HEVC deblocking scheme does not differentiate between the P and the Q blocks. The filtering strength is determined by the average second derivative of P and Q (see Equations (1) and (2)), and the value of parameters β and $t_C$ depends on the average QP of P and Q. Processing the P and Q blocks the same way may provide poor results, particularly in cases where one is very smooth and the other has a high degree of detail.

Systems and techniques described herein can address the problems noted above associated with deblocking, while still being parallelization friendly and having reasonable computation complexity. The systems and techniques can apply a filtering process to video frames distorted by compression, blurring, or other defects, in order to improve objective and subjective quality of the reconstructed video. The systems and techniques can be applied to any of the existing video codecs (e.g., Advanced Video Coding (AVC), High Efficiency Video Coding (HEVC), or any other suitable video codec) or can be proposed as a coding tool to future video coding standards. The systems and techniques can also be used as a post-processing method on video frames output from either standard or proprietary codecs. Examples of features of the systems and techniques described herein are as follows.

As a first example, the average and/or difference of the local activities in P and Q blocks can be jointly used to decide the filtering mode for a segment. In one example, the average and/or difference is quantized to seven levels, forming 28 possible combinations. A segment can thus be classified into one of the 28 categories, with each category having distinct deblocking operations.

As a second example, more samples on either side of a segment can be used in determining the local activities. Better classification and filtering mode decisions can thus be made. For example, all the four lines of a segment may be used, and in each line, up to eight samples on either side of the boundary can be used.

As a third example, when processing one line of a segment, up to four samples on either side of the segment may be filtered.

As a fourth example, the boundary strength values are simplified. For example, in inter-coded slices (e.g., B-slices and P-slices), the boundary strength value can only be 1 or 0. In these examples, a boundary strength value of 2 only occurs in intra-coded slices.

As a fifth example, filter candidates can be based on boundary strength values. The number of allowed filters may also depend on boundary strength values. In one example, four filters are pre-defined for segments with a boundary strength equal to 2; for boundary strength equal to 1, there are fifteen. Note that the set of four filters for boundary strength equal to 2 is a subset of the fifteen filters for boundary strength equal to 1. All the filters are 11-taps long.

As a sixth example, filters are not assigned to categories. An optimal filter can instead be selected from the pool of filters at the slice/tile/picture/sequence level.

The deblocking scheme described herein can be applied with respect to boundaries and segments. In the next generation video coding standards, the concepts of CU, PU, and TU may be considered to be the same (e.g., a CU is not further split into PU or TU). Due to a flexible block splitting structure, the shape of a CU does not have to be a square as in HEVC; instead, the CU can be a rectangular with the side being as long as 128 samples and as short as 4 samples.

The proposed deblocking scheme described herein can be applied to the boundaries of CUs, which may not be at least eight samples apart. However, allowing neighboring boundaries to be closer does not lose the advantage of parallelization, as discussed further below. A boundary to be processed (no matter how long) can be divided into multiple non-overlapped 4-sample segments, with each segment then being the smallest unit to be processed.

In the following discussion, the deblocking operations on a vertical segment will be discussed. The processing of horizontal segments is essentially the same.

Boundary strength can be determined based on whether a slice is intra-coded or inter-coded. For intra-coded slices, the boundary strength derivation process is the same as that in HEVC deblocking: all the segments have boundary strength equal to 2 and should be filtered. For inter-coded slices, the boundary strength derivation is simplified, and the boundary strength can only be 0 or 1. When at least one of the following conditions are met, the boundary strength is equal to 1, otherwise the boundary strength is equal to 0:

1. At least one of the adjacent blocks is intra-coded;
2. At least one of the adjacent blocks has non-zero transform coefficients;
3. The absolute difference between the motion vectors of the adjacent blocks is greater than or equal to one integer luma sample; or
4. The motion prediction in the adjacent blocks refers to different reference pictures or the number of motion vectors is different.

When the boundary strength is 0, the deblocking operations are skipped on the segment (e.g., no deblocking is performed). Otherwise, the operations discussed below are applied.

As noted above, the local activity of a segment can be used to determine a filtering mode. Local activity measures the smoothness (e.g., uniformity) or complexity of the area near a block boundary. Local activity can be calculated in different ways, such as with a first derivative or a second derivative. A second derivative can be less sensitive to noise, and thus the second derivative is used in the below equations.

Figure 5:
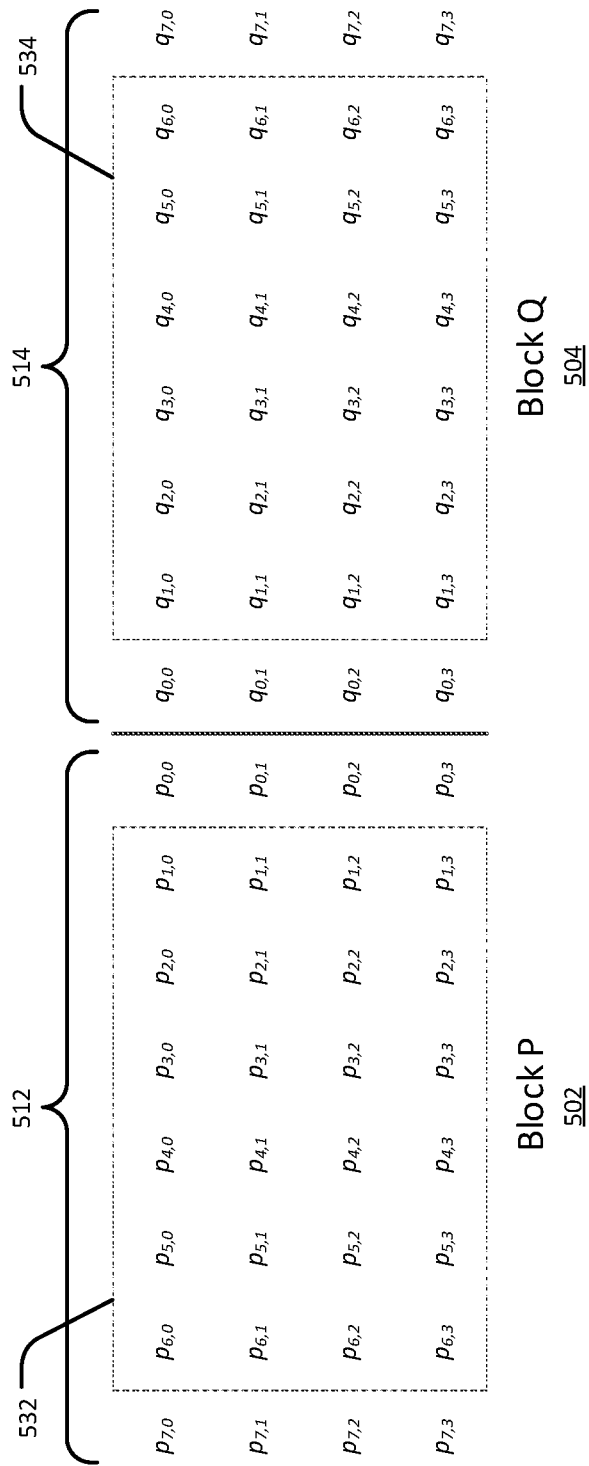
FIG. 5 includes a diagram illustrating samples that can be used to calculate the local activity along a segment.

As shown in FIG. 5 (which shows samples involved in calculating a second derivative), the absolute value of the second derivative of each sample in the dashed boxes is calculated using Equation (11):

$$|p''_{i,j}|=|p_{i-1,j}-2p_{i,j}+p_{i+1,j}| \text{ or } |q''_{i,j}|=|q_{i-1,j}-2q_{i,j}+q_{i+1,j}| \quad (11)$$

So, the inner activity of Block P, denoted as $P_A$, is represented as the average of all the $|p''_{i,j}|$ in the dashed box, as shown in Equation (12), $$P_A = \frac{1}{N}\sum_{i=1}^{6}\sum_{j=0}^{3}|p''_{i,j}| \quad (12)$$

where N is the total number of samples involved, i.e., 24 in this case. Similarly, the inner activity of Block Q, denoted as $Q_A$, is can be calculated using Equation (13).

$$Q_A = \frac{1}{N}\sum_{i=1}^{6}\sum_{j=0}^{3}|q''_{i,j}| \quad (13)$$

Note that the samples closest to the block boundary ($p_{0,j}$ and $q_{0,j}$) are not included in calculating $P_A$ or $Q_A$, because the second derivatives of these samples are supported by samples across the boundary and may not precisely reflect the inner activity of either side.

Also consider a case in which Block P or Block Q is not wide enough. For example, when the width of P or Q, denoted as $W_P$ and $W_Q$, is 4 or 8, the remote samples used in calculating second derivatives, such as $p_{7,j}$ and $q_{7,j}$, cross or approach neighboring boundaries. In these cases, the i coordinate in Equations (12) and (13) should not exceed $W_P/2$ for $P_A$ or $W_Q/2$ for $Q_A$, i.e., coordinate i is up to min(6, $W_P/2$) for $P_A$ and min(6, $W_Q/2$) for $Q_A$.

Segment classification can be performed. For example, the segment may be classified into a category based on the values of $P_A$ and $Q_A$. As has been said, the average and difference of $P_A$ and $Q_A$, denoted as $ave_{PQ}$ and $diff_{PQ}$, are jointly used for the classification:

$$ave_{PQ}=(P_A+Q_A)/2^n \quad (14)$$

$$diff_{PQ}=|P_A-Q_A|/2^n \quad (15)$$

In Equations (14) and (15), n is a variable representing how heavily $ave_{PQ}$ and $diff_{PQ}$ are quantized before they are used for classification, and can be customized. In one illustrative example, n is set to 1.

Figure 6:
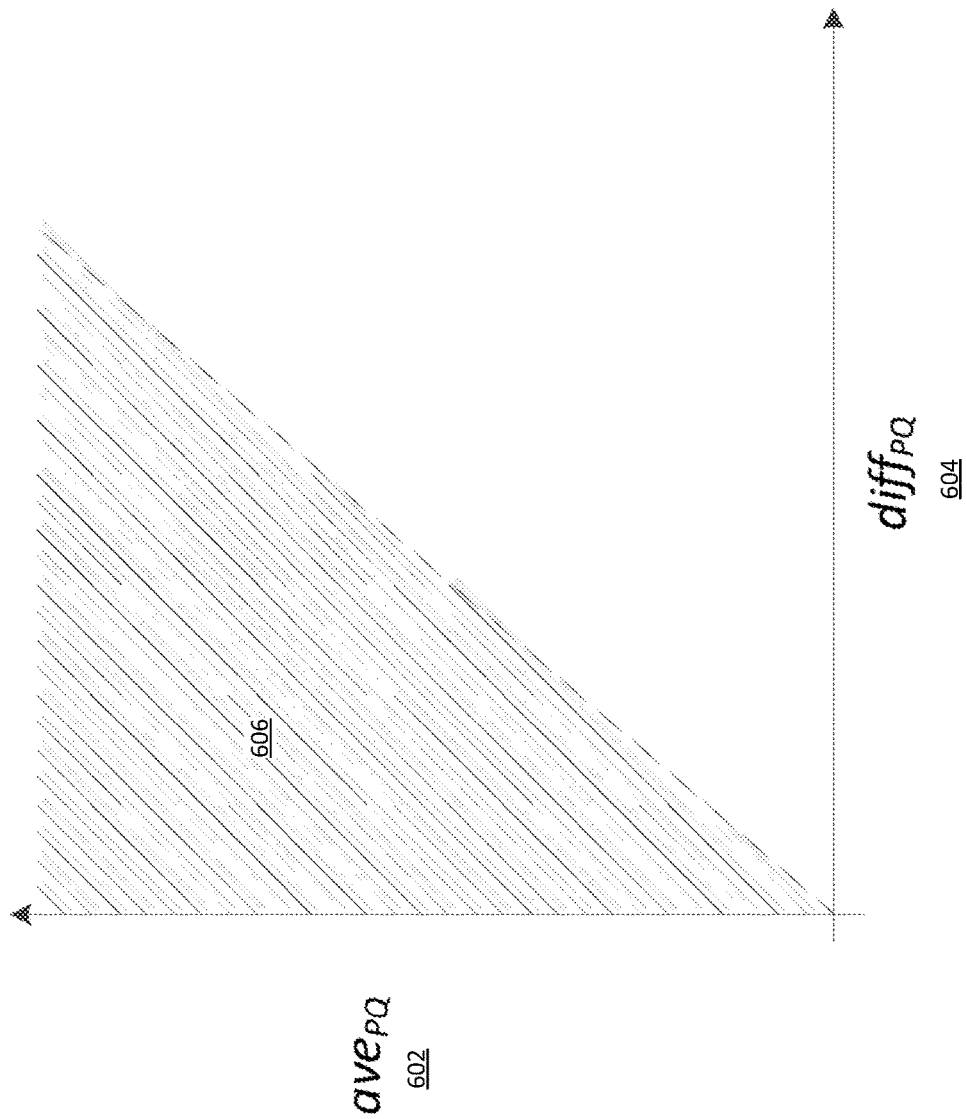
FIG. 6 includes a graph illustrating the possible combinations of the average activity and the difference in activities.

Since $P_A$ and $Q_A$ both have non-negative values, $diff_{PQ}$ cannot be greater than $ave_{PQ}$. Therefore, all the possible combinations of ($ave_{PQ}$, $diff_{PQ}$) are in the shadowed area of FIG. 6, which shows possible combination of ($ave_{PQ}$, $diff_{PQ}$).

Figure 7:
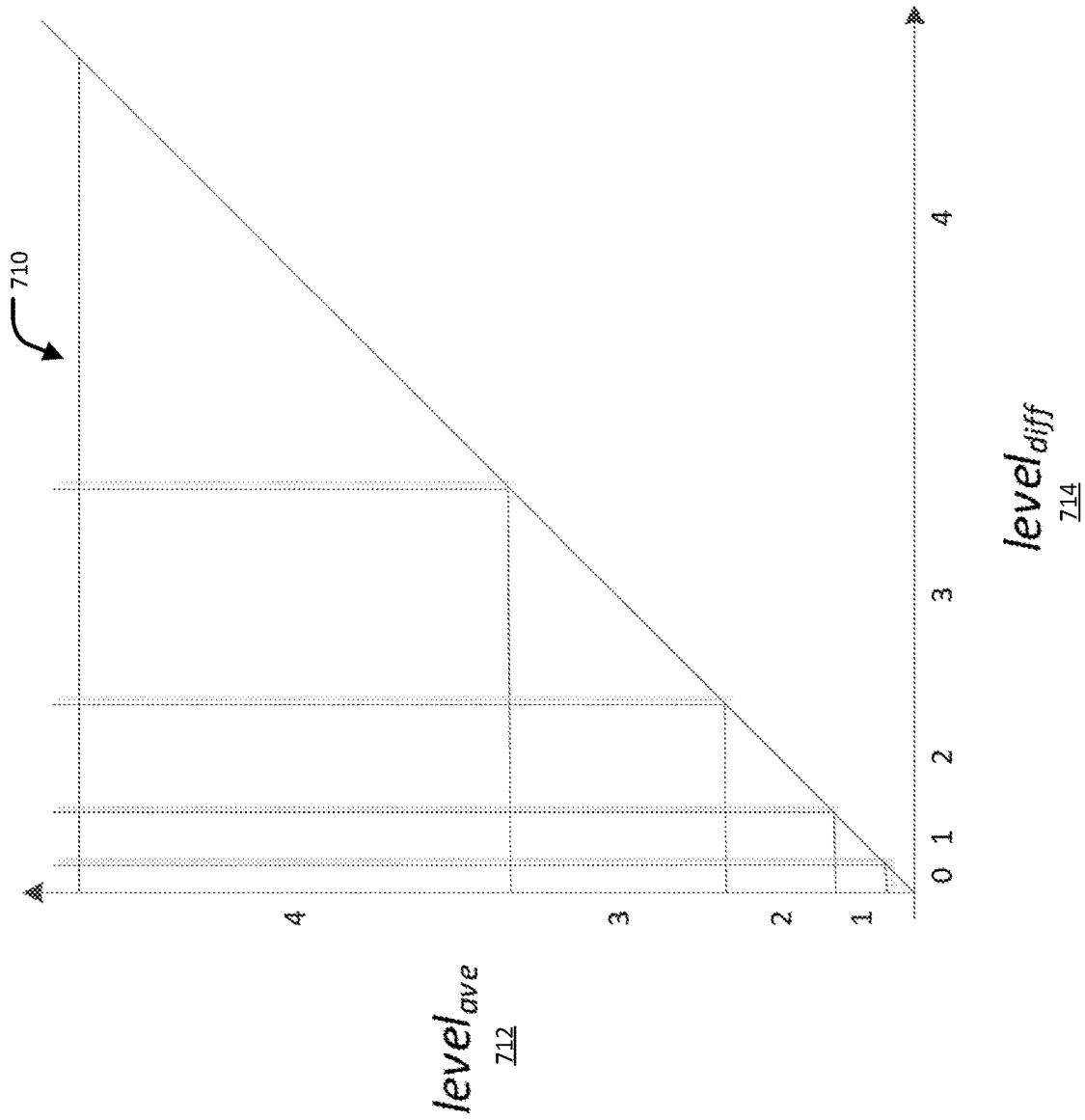
FIG. 7 includes a graph illustrating the possible combinations of the quantized average activity and quantized difference in activities.

However, the distribution of ($ave_{PQ}$, $diff_{PQ}$) is far from uniform in practice. A majority of the combination occurs in the low $ave_{PQ}$ and low $diff_{PQ}$ area (the bottom left area of the plot in FIG. 6), and cases in the upper right area of the plot in FIG. 6 could be very sparse. Applying this observation, the techniques do not perform uniform 2-D quantization on ($ave_{PQ}$, $diff_{PQ}$), and instead quantize ($ave_{PQ}$, $diff_{PQ}$) in a logarithmic (log) domain as shown, for example, in FIG. 7

(which shows Quantize ($ave_{PQ}$, $diff_{PQ}$) in a log domain). Although the areas are very different for different categories, ($ave_{PQ}$, $diff_{PQ}$) can be more evenly distributed into each category than by using uniform quantization. It may be desirable to perform the quantization in the $\log_2$ domain, and a particular example of the quantization is shown in Equations (16) and (17), $$level_{ave} = \text{floor}(\log_2(ave_{PQ} + offset_{ave})) - 1 \qquad (16)$$

$$level_{diff} = \text{floor}(\log_2(diff_{PQ} + offset_{diff})) - 1 \qquad (17)$$

where $offset_{ave}$ and $offset_{diff}$ are two parameters used to adjust the starting point a bit. In one example, both $offset_{ave}$ and $offset_{diff}$ are set to 2. It may be desirable to clip both $level_{ave}$ and $level_{diff}$ values to 6, because $level_{ave}$ or $level_{diff}$ out of the range 0 to 6 are very rare. Considering that $level_{diff}$ is not greater than $level_{ave}$, one can easily find that there are a total of 28 different combinations of ($level_{ave}$, $level_{diff}$). Each segment to be deblocked has its own $level_{ave}$ and $level_{diff}$ combination, which is used to associate the segment to a category.

Filter selection can also be performed. Like HEVC deblocking, a segment is deblocked by filtering line by line. Here, it is only described how one line is filtered. Given a line to be filtered, up to M (e.g., M=4) samples on either side of the block boundary can be modified by filtering (see FIG. 4 for an example). However, the samples to be filtered on one side should not cross half of the block width, because otherwise the filtered samples of one segment will overlap with those of the neighboring segment, which may complicate parallel processing. For example, if the width of Block P is 4, only two samples on the Block P side are filtered. More specifically, the number of samples to be filtered is $\min(M, W_P/2)$ for Block P and $\min(M, W_Q/2)$ for Block Q.

In HEVC deblocking, the filter selection for the samples ($p_0$ to $p_3$ and $q_0$ to $q_3$ in FIG. 4) depends on their distances to the segment, which means that $p_1$ and $q_1$ share the same filter. The assumption is that the local activities of Block P and Block Q are similar. However, based on studies, the assumption does not always hold. Instead, Block P and Block Q can often have extremely different local activities (i.e., $level_{ave}$ is equal to $level_{diff}$), and for this reason the two blocks may be split by a smart encoding strategy.

In this application, the local activities of Block P and Block Q, $P_A$ and $Q_A$ (see Eqs. (12) and (13)), are compared. If $P_A$ is smaller than $Q_A$, meaning Block P is smoother, the samples in Block P will have Type 0 filtering and the samples in Block Q will have Type 1 filtering, and vice versa. For each filtering type, the 4 samples (or 2 samples, if the block width is 4) have their own filters, and therefore up to 8 different filters may be used to deblock one line.

To summarize, four arguments can be determined before selecting the right filter for a sample: (1 and 2) the category of the segment, which is two-dimensional with $level_{ave}$ and $level_{diff}$; (3) the filtering type (i.e., Type 0 or Type 1), and (4) the distance from the segment (i.e., the closest, the second closest, etc.), denoted as pos. The total number of all the possible combinations of the four arguments is 224 (28×2×4). A 224-entry 4-D LUT, which may be determined, coded, and transmitted by the encoder, stores the filter indices for all the possible cases (e.g., each entry stores one filter index for the corresponding combination), and takes the four arguments as the indices for searching.

Pre-defined filters can be defined and used in some cases. Unlike HEVC deblocking, where different boundary strengths only make a difference in clipping values, the boundary strength values using the techniques described herein have a direct impact on filter selection. Since the local activities of the areas near BS2 segments and BS1 segments could be very different, two sets of 11-tap FIR filters are pre-defined for them, denoted respectively as FilterSetBS2 for BS2 segments and FilterSetBS1 for BS1 segments. Since BS2 segments are only in intra-coded slices and BS1 segments are only in inter-coded slices, one set of filters (either FilterSetBS1 or FilterSetBS2) is used for deblocking a certain slice.

One or more (e.g., all of) the pre-defined filters may be obtained by off-line training. For FilterSetBS2, several different set sizes were tried, e.g., a filter set including 4, 8, 16, . . . , or 64 pre-defined filters, and it was found that the performance is not improved proportionally with the increase of the filter set size. Considering the overhead bits used to signal the filter indices, a big-size filter set may not be a good trade-off between performance and overhead size, in which case 4 filters can be pre-defined in FilterSetBS2. Including the identity filter, which is equivalent to no filtering, FilterSetBS2 includes 5 filters. FIGS. 14-16 give examples of FilterSetBS2, with sizes 16, 8, and 4, respectively. In some examples, the FilterSetBS2 in FIG. 16 can be used.

For FilterSetBS1, it was found that the performance is a bit more sensitive to filter set size increase, especially when the filter set size is smaller than 16. So, it can be determined to choose to pre-define 15 filters in FilterSetBS1. Including the identity filter, FilterSetBS1 includes 16 filters, as shown in FIG. 17. Note that FilterSetBS2 is a subset of FilterSetBS1 (compare FIG. 16 with the first four filters in FIG. 17), because the BS1 segments with intra adjacent blocks could have similar local activities with BS2 segments and may be better deblocked by filters from FilterSetBS2.

Note that in FIGS. 14-17, the filters can be directly used for filtering the samples in Block P, but need to be flipped left to right before being used for filtering the samples in Block Q. Given a filter, the highlighted tap (boldfaced and underlined in FIGS. 14-18) is the filter center, which should be multiplied with the sample to be filtered. As can be seen, these pre-defined filters are designed to have more supporting samples close to and even across the segment than far away from the segment.

The filtering process is now described. It is first described how to filter a sample $p_i$ in Block P, and the filter is denoted as a vector $h = \{h_{-4}, h_{-3}, \ldots, h_0, h_1, \ldots, h_6\}$. The filtered sample $p_i'$ may be obtained by using Equation (18), as below.

$$p'_i = \Sigma_{j=-4}^{6} p_{i+j} h_j \qquad (18)$$

Figure 8:
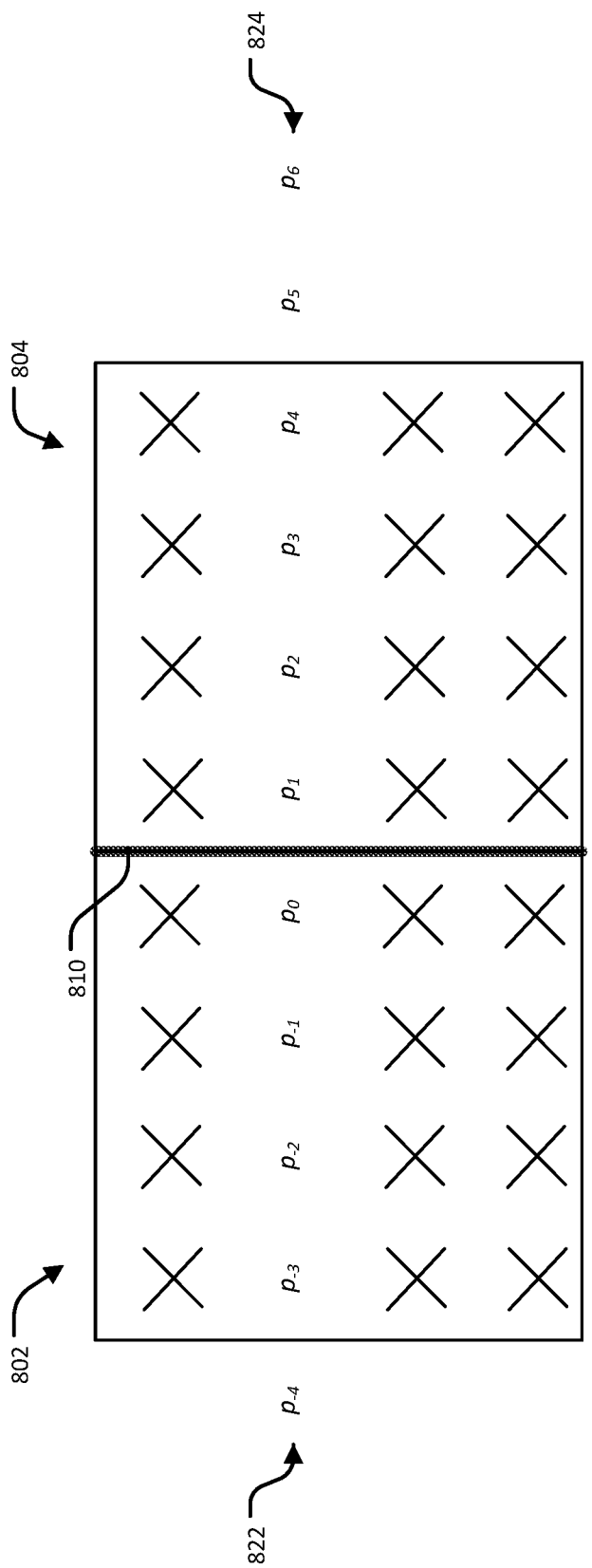
FIG. 8 includes a diagram illustrating additional samples that can be used to in the filtering process.

As can be seen, the supporting samples to filter $p_i$ include $p_i$ itself, four samples from left, and six samples from right. However, if Block P or Block Q is not wide enough, the supporting samples may be located outside the two blocks. FIG. 8 (which shows an example in which the supporting samples are located outside P or Q) gives an example that $p_0$ is to be filtered and the widths of P and Q are both 4. It might be desired to avoid this situation, because the samples to the right of Block Q, such as $p_5$ and $p_6$ in FIG. 8, might not have been reconstructed and the sample to the left of Block P, such as $p_{-4}$ in FIG. 8, which although it may have been reconstructed, may be outside a slice or tile boundary, and thus unavailable as well. To address this problem, an 11-point buffer can be created to store all the supporting samples for filtering $p_i$, denoted as buf (the element is buf(j), j=−4, −3, . . . , 6). If $p_{i-4}, p_{i-3}, \ldots, p_i, p_{i+1}, \ldots, p_{i+6}$ are all inside Block P or Block Q, buf is $\{p_{i-4}, p_{i-3}, \ldots, p_i, \ldots, p_{i+1}, \ldots, p_{i+6}\}$; otherwise, the samples located outside P and Q may be obtained by padding. In the example of FIG. 8, buf is $\{p_{-3}, p_{-3}, p_{-2}, p_{-1}, p_0, p_1, p_2, p_3, p_4, p_4, p_4\}$. So, Equation (18) is re-written as Equation (19).

$$p'_i = \sum_{j=-4}^{6} buf(j) h_j \qquad (19)$$

The filtering process for a sample $q_i$ in Block Q is similar, except that the pre-defined filter should be flipped left to right before being used.

In practice, the filtering process can be implemented in integer arithmetic. So, the real-valued filter coefficients in FIG. 17 can be converted into integers, by multiplying the filter coefficients by 2N and rounding, and the results can be manually adjusted to make sure the filter gain is exactly 2N. Here, N can be set to be 9, so that the filtering can be implemented in 32-bit-width without any noticeable performance degradation compared with using the original real-valued filter coefficients. Denote the integer filter as $f = \{f_{-4}, f_{-3}, \ldots, f_0, f_1, \ldots, f_6\}$, and Equation (19) is re-written as in Equation (20). FIG. 18 shows the integer representation of FilterSetBS1, where N is 9.

$$p'_i = ((\sum_{j=-4}^{6} buf(j) f_j) + 256) >> 9 \qquad (20)$$

In another embodiment, the local activities of Block P and Block Q are compared. If Block P's local activity is smaller, the filtering process as described above is applied. Otherwise, the supporting samples (i.e., buf) are flipped left to right, before being used. Then, filtering is applied on the flipped samples. The output of the filtering is flipped left to right back again, and becomes the output of deblocking.

Clipping and Final Output are now described. The change of sample magnitude caused by filtering can be calculated as in Equation (21), $$\Delta p = p' - p \qquad (21)$$

where p and p' are the sample values before and after filtering, respectively. The value of $\Delta p$ should not exceed a range, to avoid excessive filtering, and therefore should be clipped. Unlike HEVC deblocking, where the range $\pm t_c$ depends on QP and boundary strength, using the techniques described herein, $t_c$ is signaled at the picture/slice/tile level. The value of $t_c$ may be independent of boundary strength and category index. In addition, $t_c$ could be different for filtering horizontal and vertical boundaries. In one example, two clipping values $t_{C,VER}$ and $t_{C,HOR}$ are signaled at the picture level. In the first stage, when all the vertical boundaries are being filtered, $t_{C,VER}$ is used for clipping, as shown in Equation (22).

$$p_{out} = p + \text{Clip3}(-t_{C,VER}, t_{C,VER}, \Delta p) \qquad (22)$$

In the second stage, when all the horizontal boundaries are being filtered, $t_{C,HOR}$ is used for clipping, as shown in Equation (23).

$$p_{out} = p + \text{Clip3}(-t_{C,HOR}, t_{C,HOR}, \Delta p) \qquad (23)$$

The encoder has the freedom to find the optimal $t_{C,VER}$ and $t_{C,HOR}$, and codes them into the bitstream. In one embodiment, the encoder can minimize the MSE between $p_{out}$ and the original samples, by solving an optimization problem as in Equation (24), $$\arg\min_{t_c} \sum_i (p(i) + \text{Clip3}(-t_c, t_c, \Delta p(i)) - s(i))^2 \qquad (24)$$

where $t_c$ is $t_{C,VER}$ and $t_{C,HOR}$ for Stage 1 and Stage 2, respectively; i is any sample involved in deblocking; and s(i) is the original value of sample i.

In another embodiment, the weighted summation of $p_{out}$ and p is used as the final output, as in Equation (25), $$p_{final} = w p_{out} + (1-w) p \qquad (25)$$

where w is a non-negative weighting factor, ranging from 0 to 1, and is determined by the encoder and transmitted in the bitstream.

Parallelization can be used. The HEVC deblocking is very friendly to parallel processing, as described above, because in each stage, the samples involved in deblocking one boundary do not overlap with the samples involved in deblocking any other boundaries. To achieve this goal, the following three conditions should be satisfied:

1. The to-be-filtered samples of one segment do not overlap with the to-be-filtered samples of any other segments, because the samples at the overlapped position may be overwritten multiple times otherwise, and the final output depends on the processing order of the neighboring boundaries;
2. The filtered samples of one boundary should not be used as the supporting samples for filtering the samples of any other segments; and
3. The filtered samples of one boundary should not be used to make deblocking-rated decisions (such as classification, local activity calculation, and filter selection) for any other segments.

The techniques described herein satisfy all three conditions, even though the boundaries to be deblocked may not be at least eight samples apart (see above with respect to the summary of the techniques described herein). Therefore, it also allows an easy way to parallelization, as HEVC deblocking does. The details are illustrated as below.

Regarding Condition 1, as discussed above with reference to filter selection, the number of samples to be filtered is $\min(4, W_P/2)$ for Block P and $\min(4, W_Q/2)$ for Block Q. For this reason, Condition 1 is satisfied.

Regarding Condition 2, as discussed above with reference to Equations (18) and (19), the supporting samples stored in buf are all obtained from the input of the current deblocking stage. In other words, in Stage 1, buf uses the reconstructed samples, and in Stage 2, buf uses the output samples of Stage 1. Since buf never uses the filtered samples in the current stage, Condition 2 is also satisfied.

Condition 3 is satisfied in the same way as Condition 2. As introduced above with respect to calculating local activity, the samples used for local activity calculation and classification are all the output of the previous stage.

Overhead optimization can be performed in some cases. The overhead needed to correctly deblock a picture or slice can include a 4-D LUT storing 224 filter indices for all the possible combinations of category, type, and position (see above with respect to Filter Selection) and two clipping values for horizontal and vertical deblocking, respectively (see above with respect to Clipping and Final Output). Directly coding the overhead and transmitting it in the bitstream may cost hundreds of bits, which can be too expensive for a picture or a slice. The techniques described herein compress the overhead in three lossy ways—default merge, flexible merge, and Temporal Overhead Prediction.

With respect to default merge, some studies were performed on how the filter is selected, given category, type, and position, and the following observations were made:

1. Samples at Position 2 and Position 3 (see FIG. 4, $p_3$ and $q_3$ are on Position 3; $p_2$ and $q_2$ are on Position 2) are very likely to select the same filter index. So the samples at these two positions may be forced to share the same filter index, and bits for signaling the filter indices for Position 3 (56 indices) are saved;

2. When boundary strength is equal to 1 and level$_{ave}$ is 6, which means the sample variance near the segment is very high, the identity filter (i.e., no filtering) is mostly selected, no matter what level$_{diff}$, type, and position are. This selection is appropriate, because blocking artifacts are well masked and no deblocking is needed. So when boundary strength is equal to 1 and level$_{ave}$ is 6, the filter index is forced to be 0, and no signaling is needed, which saves 56 indices; and 3. Block P and Block Q are not differentiated, which means given a certain level$_{ave}$, the categories with different level$_{diff}$ are merged (see FIG. 9), and Type 0 and Type 1 are also merged. By doing this, the techniques described herein have a simplified mode like HEVC deblocking, which does not differentiate Blocks P and Q either. In this simplified mode, a 2-D LUT with 18 entries (6 level$_{ave}$ levels times 3 different positions) for an inter-coded slice or 21 entries (7 level$_{ave}$ levels times 3 different positions) is coded, which is lightweighted and affordable in most coding conditions.

Flexible merge can also be performed. The techniques described herein with the default merge described above outperforms HEVC deblocking significantly. However, if a greater budget of bits is available, the possible combinations do not have to be merged so aggressively. Instead, an encoder has the freedom to merge them in a more flexible way to send as few filter indices as it can, while still maintaining good Rate-Distortion (R-D) performance. However, in this mode, not only are the filter indices coded in the bitstream, the information representing how the combinations are merged should also be included. The following embodiment shows how this can be done in one illustrative implementation.

Figure 9:
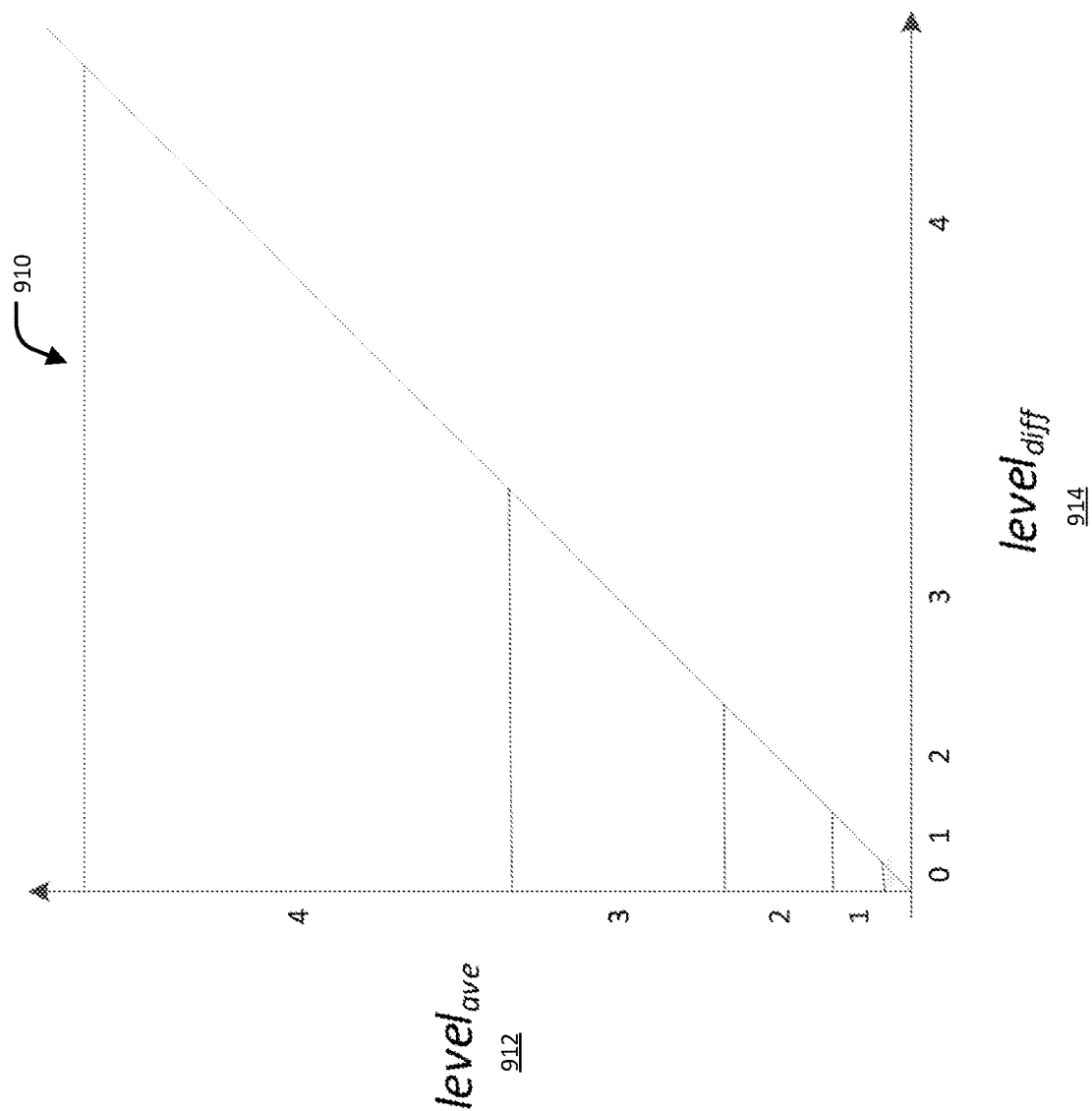
FIG. 9 includes a graph illustrating possible merged categories.
Figure 10:
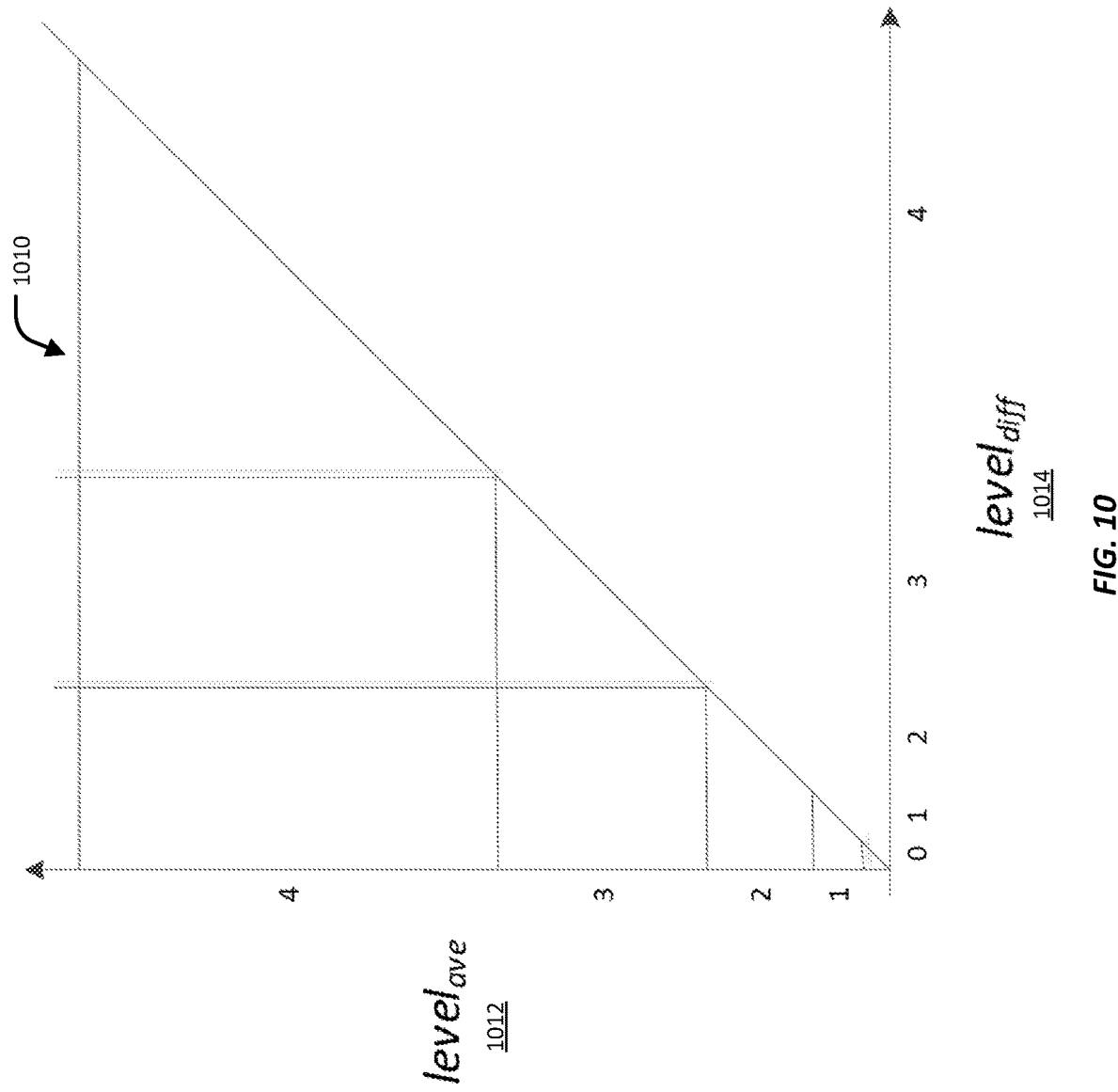
FIG. 10 includes a graph illustrating possible merged categories.

First, Block P and Block Q are not differentiated, only when level$_{diff}$ does not exceed a threshold, for a relatively small level$_{diff}$ means similar local activities in the two blocks and thus the two blocks can share the same set of filter indices. FIG. 10 (which shows for each level$_{ave}$, merge categories with different level$_{diff}$ not exceeding 2) gives an example of the threshold equal to 2. The threshold is coded into the bitstream. FIG. 9 shows, for each level$_{ave}$, categories with different level$_{diff}$ are merged.

Second, for the combinations with level$_{diff}$ not exceeding the threshold, their filter indices are stored in a 2-D LUT with 18 entries for an inter-coded slice and 21 entries for an intra-coded slice. The 2-D LUT size can be further reduced, because sometimes a sample of Position 2 and a sample of Position 1 can share the same filter index. So for each level$_{ave}$ level, a flag is signaled to indicate whether the sample of Position 2 and the sample of Position 1 share the same filter index. If it is true, overhead bits for one more filter index can be saved.

Third, the combinations with level$_{diff}$ exceeding the threshold can also be merged. In one embodiment, the categories are merged. For example, (level$_{ave}$, level$_{diff}$)=(4, 3) is merged with (level$_{ave}$, level$_{diff}$)=(5, 6). For another example, (level$_{ave}$, level$_{diff}$) equal to (3, 4), (4, 3), and (4, 4) are all merged. The total number of merged categories, denoted as M, is signaled. All the categories before merging are assigned an integer number, ranging for 0 to M−1, indicating which merged category they belong to. These integer numbers are signaled as well. For each merged category, one flag is signaled to indicate whether Type 0 and Type 1 are merged. If so, one more flags indicating whether sample of Position 2 and sample of Position 1 are merged is signaled. Otherwise, two more flags are signaled to indicate whether sample of Position 2 and sample of Position 1 are merged for Type 0 and Type 1, respectively.

Temporal overhead prediction can also be used, as noted above. The 4-D LUTs and the clipping values of the previously coded pictures are stored and allowed to be reused for deblocking the current picture. On the encoder side, the current picture may choose to use one set of the stored 4-D LUTs and clipping values, and signal only the index of the chosen set. If the encoder chooses not to reuse the previous overhead, but to send the overhead of the current picture, the sent overhead can and may need to be stored for future use. A flag indicating whether such temporal overhead prediction is used for the current picture is signaled at first. The decoder first receives a flag to know whether the temporal overhead prediction is used. If so, the index is then received, and the set of 4-D LUT and clipping values corresponding to the index is fetched to deblock the current picture. Otherwise, the decoder receives a set of one 4-D LUT and two clipping values, which is used to deblock the current picture and stored as one prediction for future use.

In another embodiment, which can be referred to as partial temporal prediction, only the 4-D LUT, which is costlier in transmission than the clipping values, can be temporally reused in the same way as described above, and the clipping values are transmitted in the bitstream for each picture.

In one example, for the current picture/slice, the index of the chosen set could only refer to 4-D LUTs from previously coded pictures with the same and/or smaller temporal layer index.

In another example, for the current picture/slice, the index of the chosen set could only refer to 4-D LUTs from previously coded pictures which are included in the current reference picture lists.

FIG. 11 includes a flowchart illustrating an example process 1100 for coding video data. The process 1100 can be implemented, for example, by a coding device (e.g., a device capable of encoding and/or decoding) that includes a memory and a processor. In this example, the memory can be configured to store video data, and the processor can be configured to perform the steps of the process 1100 of FIG. 11. For example, the coding device can include a non-transitory computer-readable medium that can store instructions that, when executed by the processor, can cause the processor to perform the steps of the process 1100. Alternatively or additionally, a non-transitory computer-readable medium can have stored thereon instructions that, when executed by one or more processors, cause the one or more processors to perform the steps of the process 1100. In some examples, the coding device can include a camera for capturing video data, and/or a display for displaying video data.

At step 1102, the process 1100 includes obtaining video data including a plurality of encoded video frames. The video data can be obtained as part of an encoding process or a decoding process.

At step 1104, the process 1100 includes determining, for a first block from an encoded video frame from the plurality of encoded video frames, a first activity among pixels in the first block.

At step 1106, the process 1100 includes determining, for a second block from the encoded video frame, a second activity among pixels in the second block, wherein the second block is immediately right of the first block within the video frame.

Activity is a measure of similarity between pixels. The first activity and the second activity can be determined using a derivative function applied to values of the pixels in the first block and the pixels in the second block. In some examples, the pixels in the first block and the pixels in the second block are along a segment of the boundary, the segment being less than the full length of the boundary. In these examples, the pixels in the first block and the pixels in the second block can be up to eight pixels away from the boundary.

At step 1108, the process 1100 includes determining, using the first activity and the second activity, an average activity of the first block and the second block.

At step 1110, the process 1100 includes determining, using the first activity and the second activity, a difference in activities between the first block and the second block. In some examples, the process 1100 can further include applying non-uniform quantization to the average activity and to the difference in activities. The non-uniform quantization produces a leveled average activity and a leveled difference in the activities. For example, the average activity and the difference in activities can each be quantized to a value between 0 and 6, inclusive. Selecting the classification can thus include using the leveled average activity and the leveled difference in the activities.

At step 1112, the process 1100 includes selecting, using the average activity and the difference in activities, a classification for a boundary between the first block and the second block.

At step 1114, the process 1100 includes selecting, using the classification, a filter. In some examples, the process 1100 can further include determining a type for the first block, the type indicating whether the pixels in the first block are similar or dissimilar. In these examples, selecting the filter further includes using the type. In some examples, the process 1100 can include selecting a different filter for the second block based on the second block being a different type than the first block.

In some examples, the process 1100 can further include determining, for a particular pixel from the pixels in the first block, a distance of the particular pixel from the boundary. In these examples, the filter can be further selected based on the distance. In some examples, the process 1100 can further include selecting a different filter for a second pixel from the pixels in the first block, based on the second pixel having a different distance from the boundary than does the particular pixel.

The filter may be selected by using a filter index from among a plurality of filter indices. In some examples, pixels with different classifications, types, or distances from the boundary may use the same filter, i.e., have the same filter index. For example, a pixel having a first distance from the boundary may be forced to have the same filter index as a pixel having a second distance from the boundary that is different than the first distance.

At step 1116, the process 1100 includes applying the filter to the pixels in the first block or to the pixels in the second block to smooth transitions between the pixels.

At step 1118, the process 1100 includes, subsequent to applying the filter, outputting the first block and the second block to be added to a reconstructed video frame.

In some examples, an index of the filter is included in the encoded video data. For example, when encoding, the filter index can be included in the encoded bitstream. As another example, when decoding, the filter index can be read from the encoded bitstream. Additionally or alternatively, it may be desirable for the encoded bitstream to include one or more values for clipping the filtered pixel values as disclosed herein (e.g., a clipping value for filtering vertical boundaries and a clipping value for filtering horizontal boundaries).

In some examples, a boundary strength value determines whether the steps of the process 1100 are to be performed for a particular boundary segment. The boundary strength value is equal to zero or one when the slice is an inter-coded slice. A value of zero means that no deblocking will be applied (e.g., the process 1100 need not be executed), and a value of one indicates that deblocking may be applied using a first set of filters. The boundary strength value is equal to two when a slice that includes the first block and the second block is an intra-coded slice. The value of two means that deblocking may be applied using a second set of filters. In one example, the first set of filters is a set of filters (e.g., a set of 16 filters), and the second set of filters is a set of fewer filters than the first set (e.g., a set of five filters) that is a subset of the first set.

The coding techniques discussed herein may be implemented in an example video encoding and decoding system (e.g., system 100). In some examples, a system includes a source device that provides encoded video data to be decoded at a later time by a destination device. In particular, the source device may provide the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, the computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by the output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
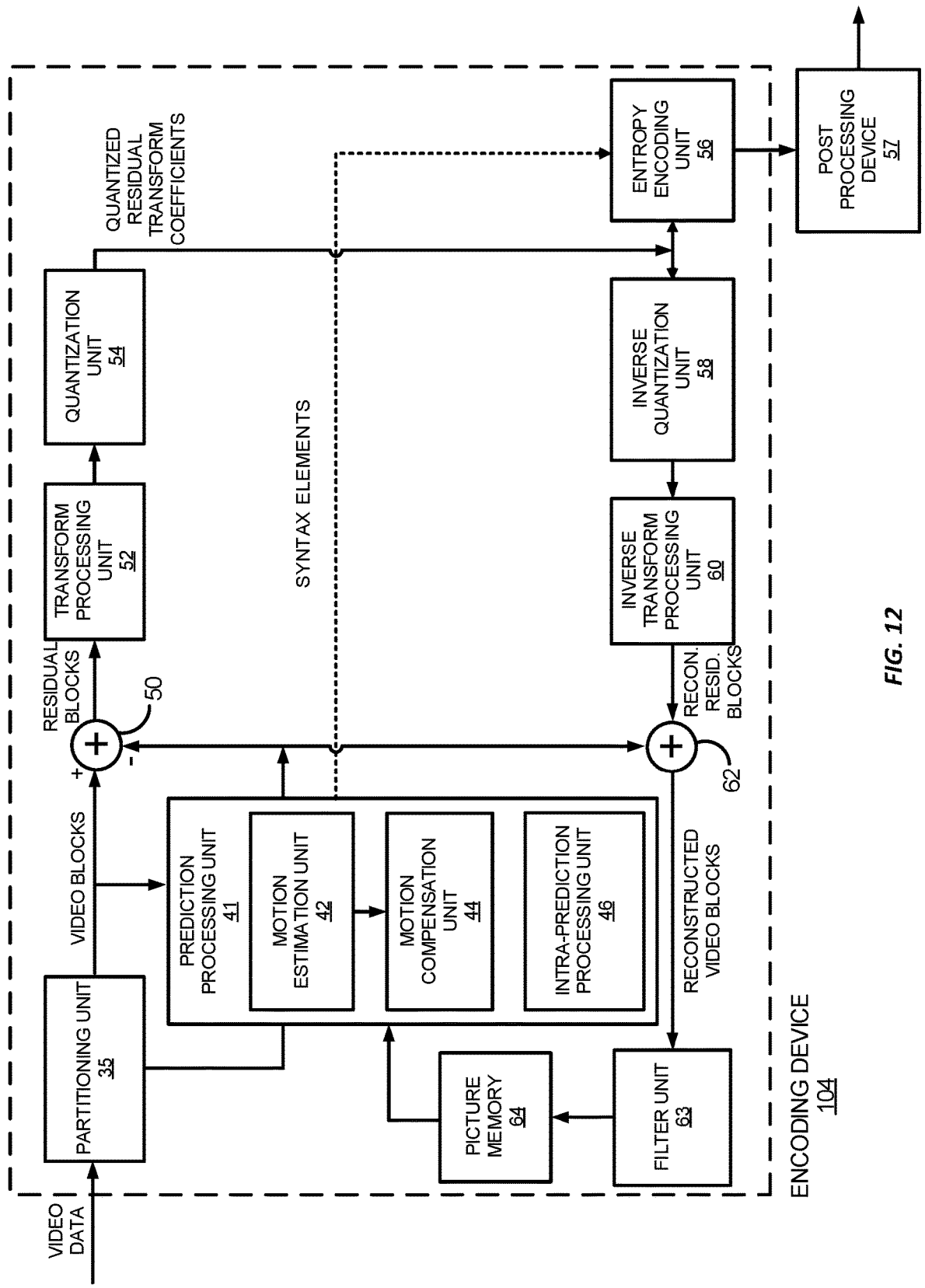
FIG. 12 is a block diagram illustrating an example encoding device.
Figure 13:
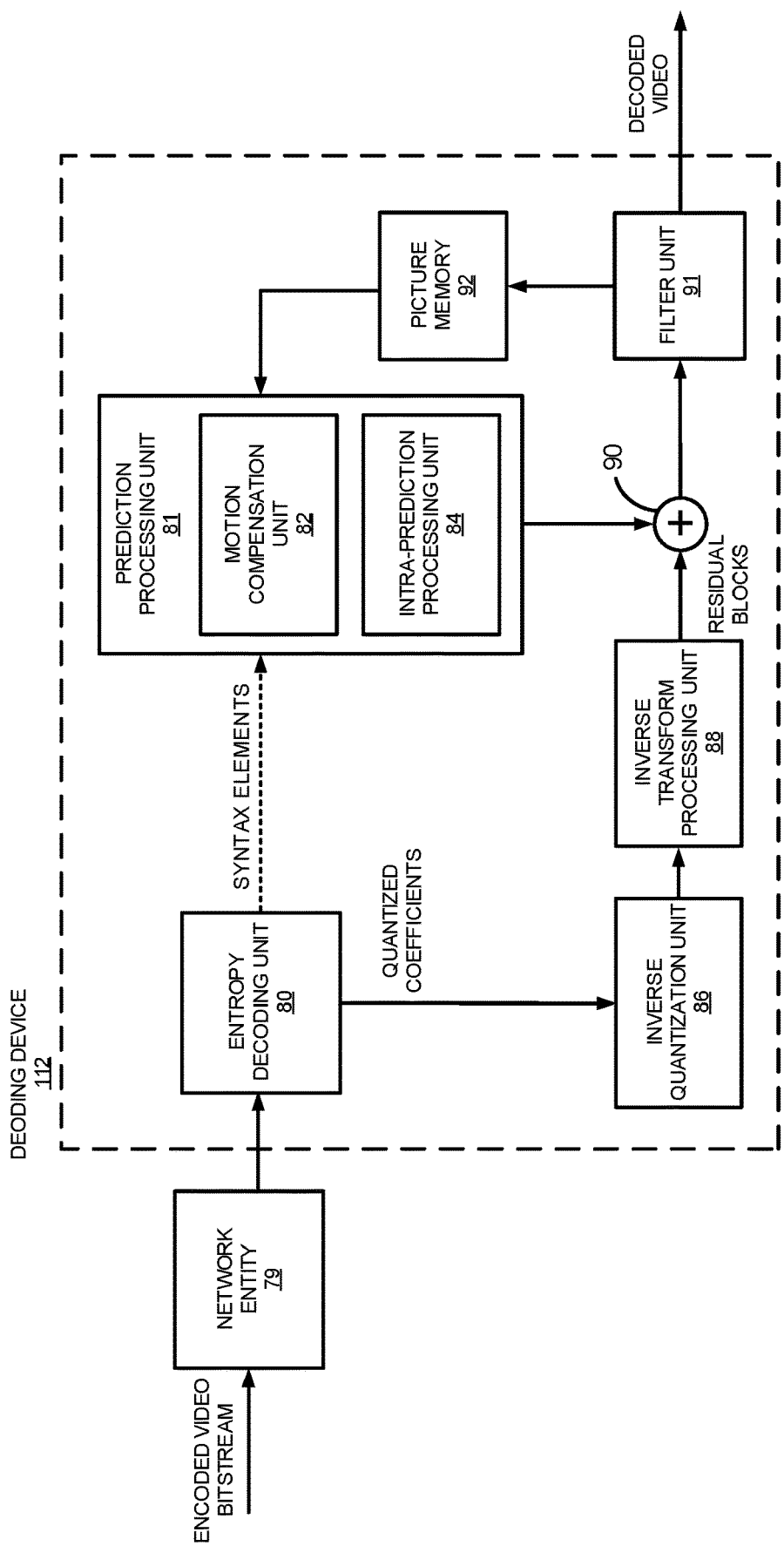
FIG. 13 is a block diagram illustrating an example decoding device.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above. The techniques of this disclosure have generally been described with respect to the encoding device 104, but as mentioned above, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A computer-implemented method of coding video data, comprising:
   obtaining, at a video coding device, video data including a plurality of encoded video frames;
   determining, for a first block from an encoded video frame from the plurality of encoded video frames, a first activity among pixels in the first block;
   determining, for a second block from the encoded video frame, a second activity among pixels in the second block, wherein the second block is immediately right of the first block within the video frame;
   determining, using the first activity and the second activity, an average activity of the first block and the second block;
   determining, using the first activity and the second activity, a difference in activities between the first block and the second block;
   selecting, using the average activity and the difference in activities, a classification for a boundary between the first block and the second block;
   selecting, using the classification, a filter;
   applying the filter to the pixels in the first block or the pixels in the second block to smooth transitions between the pixels; and
   subsequent to applying the filter, outputting the first block and the second block to be added to a reconstructed video frame.

2. The computer-implemented method of claim 1, further comprising:
   applying non-uniform quantization to the average activity and to the difference in activities, wherein the non-uniform quantization produces a leveled average activity and a leveled difference in the activities, and wherein selecting the classification further includes using the leveled average activity and the leveled difference in the activities.

3. The computer-implemented method of claim 1, further comprising:
   determining a type for the first block, the type indicating whether the pixels in the first block are similar or dissimilar, wherein selecting the filter further includes using the type.

4. The computer-implemented method of claim 3, further comprising:
   selecting a different filter for the second block based on the second block being a different type than the first block.

5. The computer-implemented method of claim 1, further comprising:
   determining, for a particular pixel from the pixels in the first block, a distance of the particular pixel from the boundary, wherein the filter is further selected based on the distance.

6. The computer-implemented method of claim 5, further comprising:
   selecting a different filter for a second pixel from the pixels in the first block based on the second pixel having a different distance from the boundary than does the particular pixel.

7. The computer-implemented method of claim 1, wherein an index of the filter is included in the encoded video data.

8. The computer-implemented method of claim 1, wherein the pixels in the first block and the pixels in the second block are along a segment of the boundary, the segment being less than the full length of the boundary, and wherein the pixels in the first block and the pixels in the second block are up to eight pixels away from the boundary.

9. The computer-implemented method of claim 1, wherein the method includes, subsequent to applying the filter and prior to outputting the first block and the second block, applying at least one clipping value to a pixel value produced by the filter.

10. The computer-implemented method of claim 1, wherein a boundary strength value is equal to two when a slice that includes the first block and the second block is an intra-coded slice, and wherein the boundary strength value is equal to zero or one when the slice is an inter-coded slice.

11. The computer-implemented method of claim 1, wherein the filter is selected by using a filter index from among a plurality of filter indices, and wherein the selecting includes forcing a first pixel of the first block to have the same filter index as a second pixel of the first block.

12. A video coding device, comprising:
   a memory configured to store video data, the video data including a plurality of encoded video frames; and
   a processor configured to:
      determine, for a first block from an encoded video frame from the plurality of encoded video frames, a first activity among pixels in the first block;
      determine, for a second block from the encoded video frame, a second activity among pixels in the second block, wherein the second block is immediately right of the first block within the video frame;
      determine, using the first activity and the second activity, an average activity of the first block and the second block;
      determine, using the first activity and the second activity, a difference in activities between the first block and the second block;
      select, using the average activity and the difference in activities, a classification for a boundary between the first block and the second block;
      select, using the classification, a filter;
      apply the filter to the pixels in the first block or the pixels in the second block to smooth transitions between the pixels; and
      subsequent to applying the filter, output the first block and the second block to be added to a reconstructed video frame.

13. The video coding device of claim 12, wherein the processor is further configured to:
   apply non-uniform quantization to the average activity and to the difference in activities, wherein the non-uniform quantization produces a leveled average activity and a leveled difference in the activities, and wherein selecting the classification further includes using the leveled average activity and the leveled difference in the activities.

14. The video coding device of claim 12, wherein the processor is further configured to:
   determine a type for the first block, the type indicating whether the pixels in the first block are similar or dissimilar, wherein selecting the filter further includes using the type.

15. The video coding device of claim 14, wherein the processor is further configured to:
   select a different filter for the second block based on the second block being a different type than the first block.

16. The video coding device of claim 12, wherein the processor is further configured to:
   determine, for a particular pixel from the pixels in the first block, a distance of the particular pixel from the boundary, wherein the filter is further selected based on the distance.

17. The video coding device of claim 16, wherein the processor is further configured to:
   select a different filter for a second pixel from the pixels in the first block based on the second pixel having a different distance from the boundary than does the particular pixel.

18. The video coding device of claim 12, wherein an index of the filter is included in the encoded video data.

19. The video coding device of claim 12, wherein the pixels in the first block and the pixels in the second block are along a segment of the boundary, the segment being less than the full length of the boundary, and wherein the pixels in the first block and the pixels in the second block are up to eight pixels away from the boundary.

20. The video coding device of claim 12, wherein the processor is further configured to apply, subsequent to applying the filter and prior to outputting the first block and the second block, at least one clipping value to a pixel value produced by the filter.

21. The video coding device of claim 12, wherein a boundary strength value is equal to two when a slice that includes the first block and the second block is an intra-coded slice, and wherein the boundary strength value is equal to zero or one when the slice is an inter-coded slice.

22. The video coding device of claim 12, wherein the filter is selected using a filter index from among a plurality of filter indices, and wherein the selecting includes forcing a first pixel of the first block to have the same filter index as a second pixel of the first block.

23. The video coding device of claim 12, further comprising:
   a camera for capturing video data.

24. The video coding device of claim 12, further comprising:
   a display for displaying decoded video data.

25. A non-transitory computer-readable medium having stored thereon instructions that, when executed by one or more processors of a video coding device, cause the one or more processors to perform operations including:
   obtaining video data including a plurality of encoded video frames;
   determining, for a first block from an encoded video frame from the plurality of encoded video frames, a first activity among pixels in the first block;
   determining, for a second block from the encoded video frame, a second activity among pixels in the second block, wherein the second block is immediately right of the first block within the video frame;
   determining, using the first activity and the second activity, an average activity of the first block and the second block;
   determining, using the first activity and the second activity, a difference in activities between the first block and the second block;
   selecting, using the average activity and the difference in activities, a classification for a boundary between the first block and the second block;
   selecting, using the classification, a filter;
   applying the filter to the pixels in the first block or the pixels in the second block to smooth transitions between the pixels; and
   subsequent to applying the filter, outputting the first block and the second block to be added to a reconstructed video frame.

26. The non-transitory computer-readable medium of claim 25, wherein the operations further include:
   applying non-uniform quantization to the average activity and to the difference in activities, wherein the non-uniform quantization produces a leveled average activity and a leveled difference in the activities, and wherein selecting the classification further includes using the leveled average activity and the leveled difference in the activities.

27. The non-transitory computer-readable medium of claim 25, wherein the operations further include:
   determining a type for the first block, the type indicating whether the pixels in the first block are similar or dissimilar, wherein selecting the filter further includes using the type.

28. The non-transitory computer-readable medium of claim 25, wherein the operations further include:
   determining, for a particular pixel from the pixels in the first block, a distance of the particular pixel from the boundary, wherein the filter is further selected based on the distance.

29. An apparatus, comprising:
   means for obtaining video data including a plurality of encoded video frames;
   means for determining, for a first block from an encoded video frame from the plurality of encoded video frames, a first activity among pixels in the first block;
   means for determining, for a second block from the encoded video frame, a second activity among pixels in the second block, wherein the second block is immediately right of the first block within the video frame;
   means for determining, using the first activity and the second activity, an average activity of the first block and the second block;
   means for determining, using the first activity and the second activity, a difference in activities between the first block and the second block;
   means for selecting, using the average activity and the difference in activities, a classification for a boundary between the first block and the second block;
   means for selecting, using the classification, a filter;
   means for applying the filter to the pixels in the first block or the pixels in the second block to smooth transitions between the pixels; and
   subsequent to applying the filter, means for outputting the first block and the second block to be added to a reconstructed video frame.

30. The apparatus according to claim 29, wherein the means for selecting a filter comprises means for selecting a first set of filters if the classification has a first value and means for selecting a second set of filters if the classification has a second value different than the first value,
   wherein the second set of filters is a set of fewer filters than the first set and is a subset of the first set.

* * * * *